(12) United States Patent
Okazaki et al.

(10) Patent No.: US 11,685,162 B2
(45) Date of Patent: *Jun. 27, 2023

(54) LIQUID CARTRIDGE

(71) Applicant: BROTHER KOGYO KABUSHIKI KAISHA, Nagoya (JP)

(72) Inventors: Naoya Okazaki, Gifu-ken (JP); Tetsuro Kobayashi, Nagoya (JP); Hiroaki Takahashi, Nagoya (JP); Kosuke Nukui, Nagoya (JP); Akihito Ono, Nagoya (JP); Mikio Hirano, Okazaki (JP); Suguru Tomoguchi, Okazaki (JP); Yutao Wang, Obu (JP); Tomohiro Kanbe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 67 days.

This patent is subject to a terminal disclaimer.

(21) Appl. No.: 17/199,588

(22) Filed: Mar. 12, 2021

(65) Prior Publication Data

US 2021/0291542 A1     Sep. 23, 2021

Related U.S. Application Data

(63) Continuation of application No. 16/811,665, filed on Mar. 6, 2020, now Pat. No. 10,960,676, which is a
(Continued)

(30) Foreign Application Priority Data

Mar. 27, 2015 (JP) .................................. 2015-066109

(51) Int. Cl.
*B41J 2/175* (2006.01)
*G01F 23/292* (2006.01)

(52) U.S. Cl.
CPC .......... *B41J 2/17526* (2013.01); *B41J 2/175* (2013.01); *B41J 2/1752* (2013.01);
(Continued)

(58) Field of Classification Search
CPC .... B41J 2/17526; B41J 2/175; B41J 2/17513; B41J 2/1752; B41J 2/17553;
(Continued)

(56) References Cited

U.S. PATENT DOCUMENTS 5,886,719 A   3/1999 Zepeda
5,949,459 A   9/1999 Gasvoda et al.
(Continued)

FOREIGN PATENT DOCUMENTS

EP   2 607 082 A1   6/2013
EP   2607082 A1    6/2013
(Continued)

OTHER PUBLICATIONS

Office Action issued in corresponding Malaysian Patent Application No. PI 2017705037, dated Apr. 16, 2021.
(Continued)

*Primary Examiner* — Matthew Luu
*Assistant Examiner* — Alexander D Shenderov
(74) *Attorney, Agent, or Firm* — Merchant & Gould P.C.

(57) ABSTRACT

A liquid cartridge includes a first surface, a second surface spaced apart from the first surface, and a third surface extending between the first surface and the second surface, with a liquid outlet through the first surface. A circuit board is mounted on the third surface. A locking mechanism includes a locking surface that extends above the third surface, and a liquid detection mechanism includes a light access portion. The light access portion is disposed between
(Continued)

the circuit board and the locking surface, and the circuit board is disposed between the first surface and the light access portion.

20 Claims, 16 Drawing Sheets

Related U.S. Application Data continuation of application No. 16/261,125, filed on Jan. 29, 2019, now Pat. No. 10,596,819, which is a continuation of application No. 15/835,833, filed on Dec. 8, 2017, now Pat. No. 10,239,322, which is a continuation of application No. 15/399,137, filed on Jan. 5, 2017, now Pat. No. 9,862,200, which is a continuation of application No. 14/838,640, filed on Aug. 28, 2015, now Pat. No. 9,550,366.

(52) U.S. Cl.
CPC ....... *B41J 2/17513* (2013.01); *B41J 2/17543* (2013.01); *B41J 2/17553* (2013.01); *B41J 2/17566* (2013.01); *B41J 2002/17573* (2013.01); *B41J 2002/17576* (2013.01); *G01F 23/2922* (2013.01)

(58) Field of Classification Search
CPC ................ B41J 2/17566; B41J 2/17543; B41J 2002/17573; B41J 2002/17576; G01F 23/2922
USPC .......................................................... 347/86
See application file for complete search history.

(56) References Cited

U.S. PATENT DOCUMENTS

| | | | |
|---|---|---|---|
| 6,209,996 | B1 | 4/2001 | Gasvoda et al. |
| 6,286,921 | B1 | 9/2001 | Ochi et al. |
| 6,832,830 | B2 | 12/2004 | Seino |
| 7,350,909 | B2 | 4/2008 | Takagi et al. |
| 8,272,704 | B2 | 9/2012 | Gilson et al. |
| 8,439,488 | B2 | 5/2013 | Nakamura et al. |
| 8,529,036 | B2 | 9/2013 | Kodama et al. |
| 8,562,116 | B2 | 10/2013 | Kanbe et al. |
| 8,585,193 | B2 | 11/2013 | Kanbe et al. |
| 8,596,771 | B2 | 12/2013 | Takagi et al. |
| 8,596,772 | B2 | 12/2013 | Kanbe et al. |
| 8,651,639 | B2 | 2/2014 | Kanbe et al. |
| 8,678,573 | B2 | 3/2014 | Nakamura et al. |
| 8,931,888 | B2 | 1/2015 | Kanbe et al. |
| 8,950,839 | B2 | 2/2015 | Nozawa |
| 9,205,661 | B2 | 12/2015 | Kawate |
| 2002/0039124 | A1 | 4/2002 | Nanjo et al. |
| 2003/0222940 | A1 | 12/2003 | Seino et al. |
| 2007/0149044 | A1 | 6/2007 | Asauchi |
| 2008/0204527 | A1 | 8/2008 | Yuen |
| 2009/0135237 | A1 | 5/2009 | Nakamura et al. |
| 2009/0179925 | A1 | 7/2009 | Sugahara |
| 2011/0001773 | A1 | 1/2011 | Bianco et al. |
| 2011/0001781 | A1 | 1/2011 | Ishibe |
| 2011/0234658 | A1 | 9/2011 | Nozawa |
| 2011/0234716 | A1 | 9/2011 | Kubo et al. |
| 2011/0310197 | A1 | 12/2011 | Yazawa |
| 2012/0249691 | A1 | 10/2012 | Takagi et al. |
| 2013/0050357 | A1 | 2/2013 | Kanbe et al. |
| 2013/0050358 | A1 | 2/2013 | Kanbe et al. |
| 2013/0050359 | A1 | 2/2013 | Kanbe et al. |
| 2013/0050360 | A1 | 2/2013 | Kanbe et al. |
| 2013/0162733 | A1 | 6/2013 | Nakamura et al. |
| 2013/0278684 | A1 | 10/2013 | Kanbe et al. |
| 2014/0015904 | A1 | 1/2014 | Kanbe et al. |
| 2014/0055535 | A1 | 2/2014 | Takagi et al. |
| 2014/0247296 | A1 | 9/2014 | Nose |
| 2016/0279952 | A1 | 9/2016 | Wang |
| 2016/0279955 | A1 | 9/2016 | Wang et al. |
| 2016/0279958 | A1 | 9/2016 | Wang et al. |
| 2016/0279959 | A1 | 9/2016 | Okazaki et al. |

FOREIGN PATENT DOCUMENTS

| | | |
|---|---|---|
| GB | 2477297 A | 8/2011 |
| JP | 2000-309107 A | 11/2000 |
| JP | 2002-508720 A | 3/2002 |
| JP | 2005-131849 A | 5/2005 |
| JP | 2005-246781 A | 9/2005 |
| JP | 2005313447 A | 11/2005 |
| JP | 2007-144827 A | 6/2007 |
| JP | 2008-093862 A | 4/2008 |
| JP | 2008-194885 A | 8/2008 |
| JP | 2009-160783 A | 7/2009 |
| JP | 2010-23458 A | 2/2010 |
| JP | 2010-023458 A | 2/2010 |
| JP | 2012-206405 A | 10/2012 |
| JP | 2012-206407 A | 10/2012 |
| JP | 2012-206409 A | 10/2012 |
| JP | 2012-206487 A | 10/2012 |
| JP | 2013-049165 A | 3/2013 |
| JP | 2014-019130 A | 2/2014 |
| WO | 2007-003908 A1 | 1/2007 |
| WO | 2012-054050 A1 | 4/2012 |
| WO | 2015-041365 A1 | 3/2015 |

OTHER PUBLICATIONS

Office Action (Notice of Reasons for Rejection) issued in related Japanese Patent Application No. 2015-066109, dated Jul. 31, 2018.
Examination Report No. 1 for Standard Patent Application issued in related Australian Patent Application No. 2015401243, dated Apr. 13, 2018.
Office Action (Restriction Requirement) issued in related U.S. Appl. No. 14/838,438, dated Feb. 2, 2016.
International Search Report and Written Opinion against PCT Application No. PCT/JP2015/003416, dated Sep. 29, 2015.
International Search Report and Written Opinion against PCT Application No. PCT/JP2015/003419, dated Sep. 29, 2015.
International Search Report and Written Opinion against PCT Application No. PCT/JP2015/003423, dated Sep. 29, 2015.
International Search Report and Written Opinion issued in PCT Application No. PCT/JP2015/003417, dated Sep. 29, 2015.
Office Action (Notice of Allowance) issued in related U.S. Appl. No. 14/838,438, dated Jan. 26, 2017.
International Search Report and Written Opinion issued in related PCT/JP2015/003414, dated Oct. 6, 2015.
Application as filed in U.S. Appl. No. 14/838,440, filed Aug. 28, 2015.
Application as filed in U.S. Appl. No. 14/838,453, filed Aug. 28, 2015.
Application as filed in U.S. Appl. No. 14/838,438, filed Aug. 28, 2015.
Application as filed in U.S. Appl. No. 14/838,597, filed Aug. 28, 2015.
Search Report from European Patent Application No. 15174868.8, dated Feb. 12, 2016.
Search Report from European Patent Application No. 15174888.6, dated Feb. 12, 2016.
Search Report from European Patent Application No. 15174893.6, dated Feb. 12, 2016.
European Search Report issued in European Patent Application No. 15174866.2, dated Feb. 16, 2016.
European Search Report issued in European Patent Application No. 15174873.8, dated Feb. 16, 2016.
Office Action issued in related U.S. Appl. No. 14/828,597, dated Apr. 22, 2016.
Office Action issued in related U.S. Appl. No. 14/838,453, dated May 19, 2016.
U.S. Appl. No. 14/838,438, Wang et al. "Liquid Cartridge" filed Aug. 28, 2015, Claims.

(56) References Cited

OTHER PUBLICATIONS

Office Action issued in related U.S. Appl. No. 14/838,440, dated Jul. 29, 2016.
Office Action issued in related U.S. Appl. No. 14/838,438, dated Jul. 15, 2016.
Final Office Action, issued in related U.S. Appl. No. 14/838,597, dated Nov. 22, 2016.
Final Office Action, issued in related U.S. Appl. No. 14/838,453, dated Nov. 21, 2016.
Office Action (Notice of Allowance), issued in related U.S. Appl. No. 14/838,440, dated May 11, 2017.
Office Action (Notice of Allowance), issued in related U.S. Appl. No. 15/399,137, dated May 12, 2017.
Office Action (Notice of Allowance), issued in related U.S. Appl. No. 14/838,453, dated Apr. 27, 2017.
Office Action (Notice of Allowance), issued in related U.S. Appl. No. 14/838,597, dated Jun. 26, 2017.
Extended European Search Report issued in corresponding European Patent Application No. 20203256.1, dated Nov. 9, 2020.
Extended European Search Report issued in related EP Application No. 22164103.8, dated Jul. 8, 2022.

LIQUID CARTRIDGE

CROSS REFERENCE TO RELATED APPLICATIONS

The present application is a continuation of U.S. patent application Ser. No. 16/811,665, filed Mar. 6, 2020, now U.S. Pat. No. 10,960,676, which is a continuation of U.S. patent application Ser. No. 16/261,125, filed Jan. 29, 2019, now U.S. Pat. No. 10,596,819, which is continuation of U.S. patent application Ser. No. 15/835,833, filed Dec. 8, 2017, now U.S. Pat. No. 10,239,322, which is a continuation of U.S. patent application Ser. No. 15/399,137, filed Jan. 5, 2017, now U.S. Pat. No. 9,862,200, which is a continuation of U.S. patent application Ser. No. 14/838,640, filed Aug. 28, 2015, now U.S. Pat. No. 9,550,366, all of which further claim priority from Japanese Patent Application No. 2015-066109, filed on Mar. 27, 2015, the disclosures of all of which are incorporated herein by reference in their entirety.

BACKGROUND OF THE INVENTION

1. Field of the Invention

The present invention relates to a liquid cartridge.

2. Description of the Related Art

Conventional ink jet recording apparatuses known in the prior art record an image on a recording medium by expelling ink retained in an ink container from a nozzle. Some ink jet recording apparatuses are structured so that each time ink is exhausted, a new ink cartridge can be attached.

Japanese Unexamined Patent Application Publication No. 2014-19130 discloses a cartridge that can be removably attached to a cartridge attaching unit. The cartridge has a circuit board that is configured to be electrically connected to a contact mechanism provided in the cartridge attaching unit. The presence of ink in the cartridge can be detected optically.

Japanese Unexamined Patent Application Publication No. 2013-49165 discloses an ink cartridge that can be removably attached to a cartridge attaching unit. The ink cartridge has a rotating member. When the rotating member engages the cartridge attaching unit, the ink cartridge is attached to the cartridge attaching unit and is held in the attached state. The ink cartridge has a detection portion used to optically detect the amount of remaining ink. With the ink cartridge attached to the cartridge attaching unit, the detection portion is detected by an optical sensor provided in the cartridge attaching unit. The ink cartridge has an integrated circuit (IC) board in which information about the ink cartridge has been stored. When the ink cartridge is attached to the cartridge attaching unit, the IC board is electrically connected to contacts provided in the cartridge attaching unit.

SUMMARY OF THE INVENTION

In response to a request for compact ink jet recording apparatuses, it is desirable to reduce the outer dimensions of an ink cartridge without reducing the amount of ink retained in the ink cartridge. It is also desirable to make the cartridge attaching unit compact. At the same time, it is desirable that the IC board, the detection portion used to detect the amount of remaining ink, and other functional portions of the ink cartridge also contribute to high precision and the function of each functional portion be most effectively used.

According to an embodiment of the present invention, a liquid cartridge includes a first surface, a second surface spaced apart from the first surface, a third surface extending between the first surface and the second surface, with a liquid outlet through the first surface. A circuit board is mounted on the third surface. A locking mechanism includes a locking surface that extends above the third surface, and liquid detection mechanism includes a light access portion that is disposed between the circuit board and the locking surface. The circuit board is disposed between the first surface and the light access portion.

In accordance with other embodiments, a liquid cartridge includes a first surface, a second surface spaced apart from the first surface, and a third surface extending between the first surface and the second surface. A circuit board is mounted on the third surface, and a locking mechanism has a locking surface that extends above the third surface. A liquid detection mechanism includes a light access portion that extends above the third surface. An insertion detection mechanism includes a light attenuating wall that extends above the third surface.

In accordance with still further embodiments, a liquid cartridge includes a bottom surface, a top surface spaced apart from the bottom surface, a front surface extending between the top surface and the bottom surface, and a rear surface opposite the front surface and extending between the top surface and the bottom surface. A circuit board is mounted on the top surface. A locking mechanism includes a locking surface that extends above the top surface. A liquid detection mechanism includes a light access portion that extends above the top surface.

DESCRIPTION OF THE PREFERRED EMBODIMENT

Figure 1:
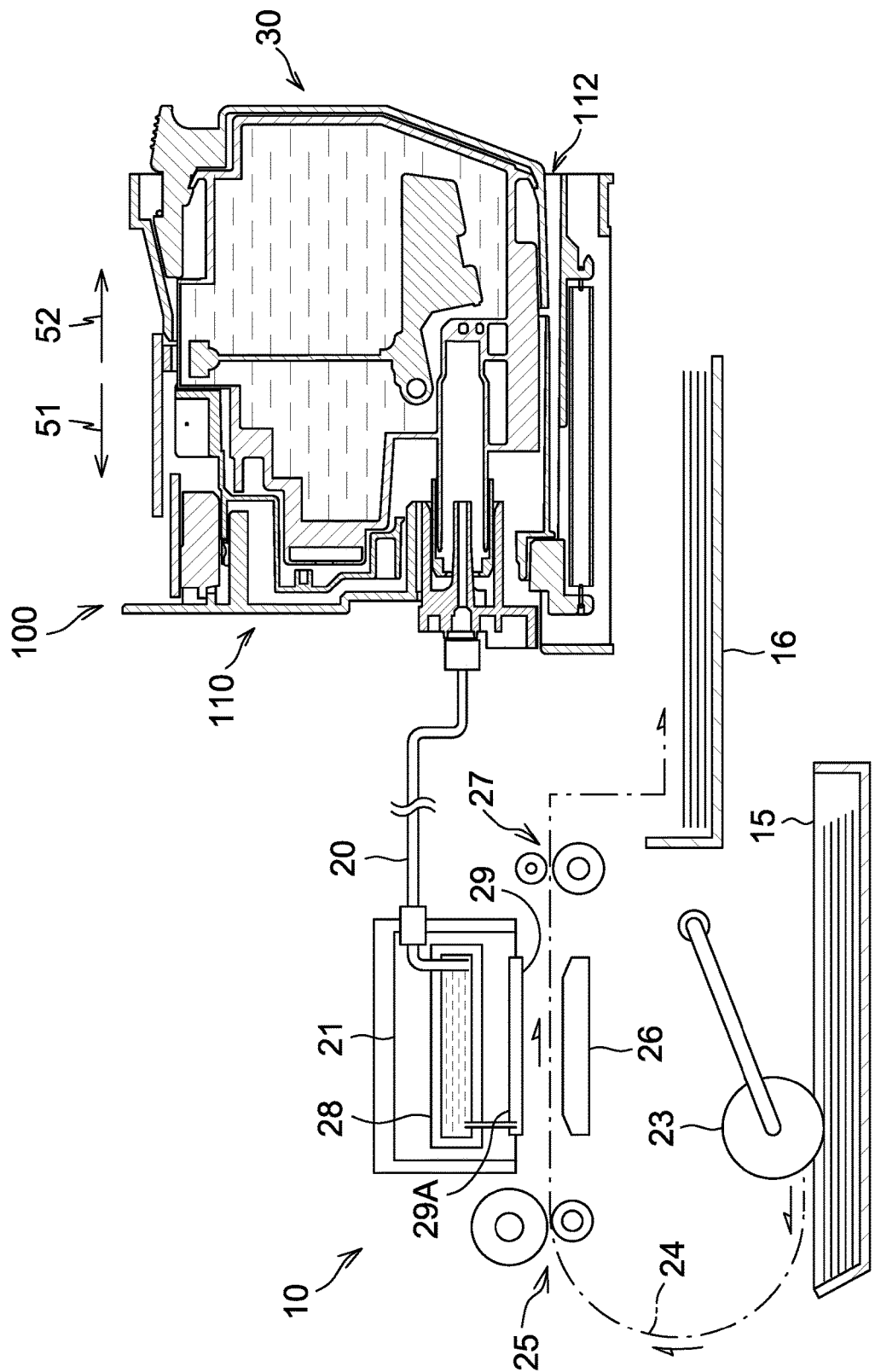
FIG. 1 is a schematic cross-sectional view schematically illustrating the internal structure of a printer having a cartridge attaching unit.

An embodiment of the present invention will be described with reference to the drawings at appropriate points. The embodiment described below is only an example of for realizing the present invention; it will be appreciated that the embodiment can be appropriately changed without departing from the intended scope of the present invention. In the description below, a direction in which an ink cartridge 30 is inserted into a cartridge attaching unit 110 will be defined as an insertion direction (an example of a first direction) 51, and a direction opposite to the insertion direction 51, that is, a direction in which the ink cartridge 30 is removed from the cartridge attaching unit 110, will be defined as a removal direction (an example of a second direction) 52. Although, in this embodiment, the insertion direction 51 and removal direction 52 are horizontal, this is not a limitation; the insertion direction 51 and removal direction 52 may be something other than horizontal in other embodiments. The direction of force of gravity will be defined as a downward direction 53, a direction opposite to the direction of force of gravity will be defined as an upward direction 54. Directions orthogonal to the insertion direction 51 and downward direction 53 will be defined as a right direction 55 and a left direction 56 (an example of a second direction). Specifically, in a state in which the ink cartridge 30 has been inserted to an attached position in the cartridge attaching unit 110, that is, in a state in which the ink cartridge 30 is in an attached orientation (an example of a first orientation and a supply orientation), when the ink cartridge 30 is viewed in the removal direction 52, a direction extending to the right will be defined in the right direction 55 and a direction extending to the left will be the left direction 56. The insertion direction 51 may be referred to as a forward direction 57 and the removal direction 52 may be referred to as a backward direction 58.

Overview of a Printer 10

As illustrated in FIG. 1, the printer 10 records an image by selectively expelling ink droplets to a recording sheet according to an inkjet recording method. The printer 10 (an example of a liquid consuming apparatus) includes a recording head 21, an ink supply unit 100, and an ink tube 20 that interconnects the recording head 21 and ink supply unit 100.

The ink supply unit 100 includes the cartridge attaching unit 110 (an example of an attaching unit). In the cartridge attaching unit 110, the ink cartridge 30 (an example of a liquid cartridge) can be attached. The cartridge attaching unit 110 has an opening 112 in its one surface. The ink cartridge 30 is inserted into the cartridge attaching unit 110 through the opening 112 in the insertion direction 51 and is removed from the cartridge attaching unit 110 in the removal direction 52.

Ink (an example of a liquid) that can be used in the printer 10 is retained in the ink cartridge 30. In a state in which the ink cartridge 30 has been attached to the cartridge attaching unit 110, the ink cartridge 30 and recording head 21 are interconnected with the ink tube 20. A sub-tank 28 is provided in the recording head 21. The sub-tank 28 temporarily retains ink to be supplied through the ink tube 20. The recording head 21 selectively expels, from nozzles 29, ink supplied from the sub-tank 28, according to an inkjet recording method. Specifically, a driving voltage is selectively applied from a head control circuit board provided in the recording head 21 to each piezoelectric device 29A provided in correspondence to one nozzle 29.

The printer 10 includes a feed tray 15, a supply roller 23, a convey roller pair 25, a platen 26, a discharge roller pair 27, and a discharge tray 16. A recording sheet is supplied by the supply roller 23 from the feed tray 15 to a conveying path 24, after which the recording sheet is conveyed by the convey roller pair 25 onto the platen 26. The recording head 21 selectively expels ink to the recording sheet that passes on the platen 26. Thus, an image is recorded on the recording sheet. After having passed the platen 26, the recording sheet is discharged by the discharge roller pair 27 to the discharge tray 16 disposed at the downstream end of the conveying path 24.

Ink Supply Unit 100

As illustrated in FIG. 1, the ink supply unit 100 is provided in the printer 10. The ink supply unit 100 supplies ink to the recording head 21 included in the printer 10. The ink supply unit 100 has the cartridge attaching unit 110 to which the ink cartridge 30 can be attached. FIG. 1 illustrates a state in which the ink cartridge 30 has been attached to the cartridge attaching unit 110, that is, in a state in which the ink cartridge 30 is in the attached orientation (first orientation and supply orientation).

Cartridge Attaching Unit 110

Figure 2:
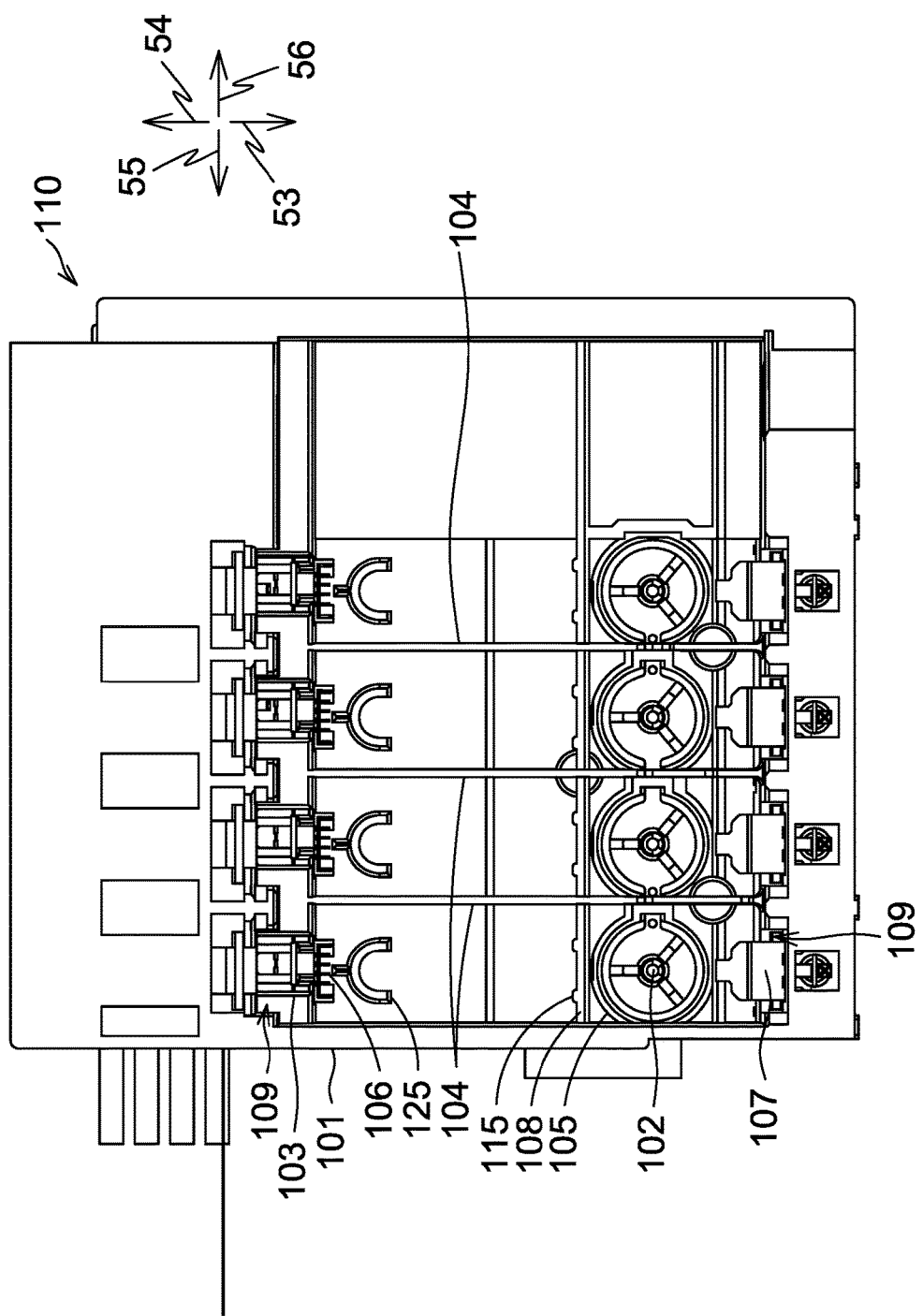
FIG. 2 is a front view illustrating the outside shape of the cartridge attaching unit.
Figure 7:
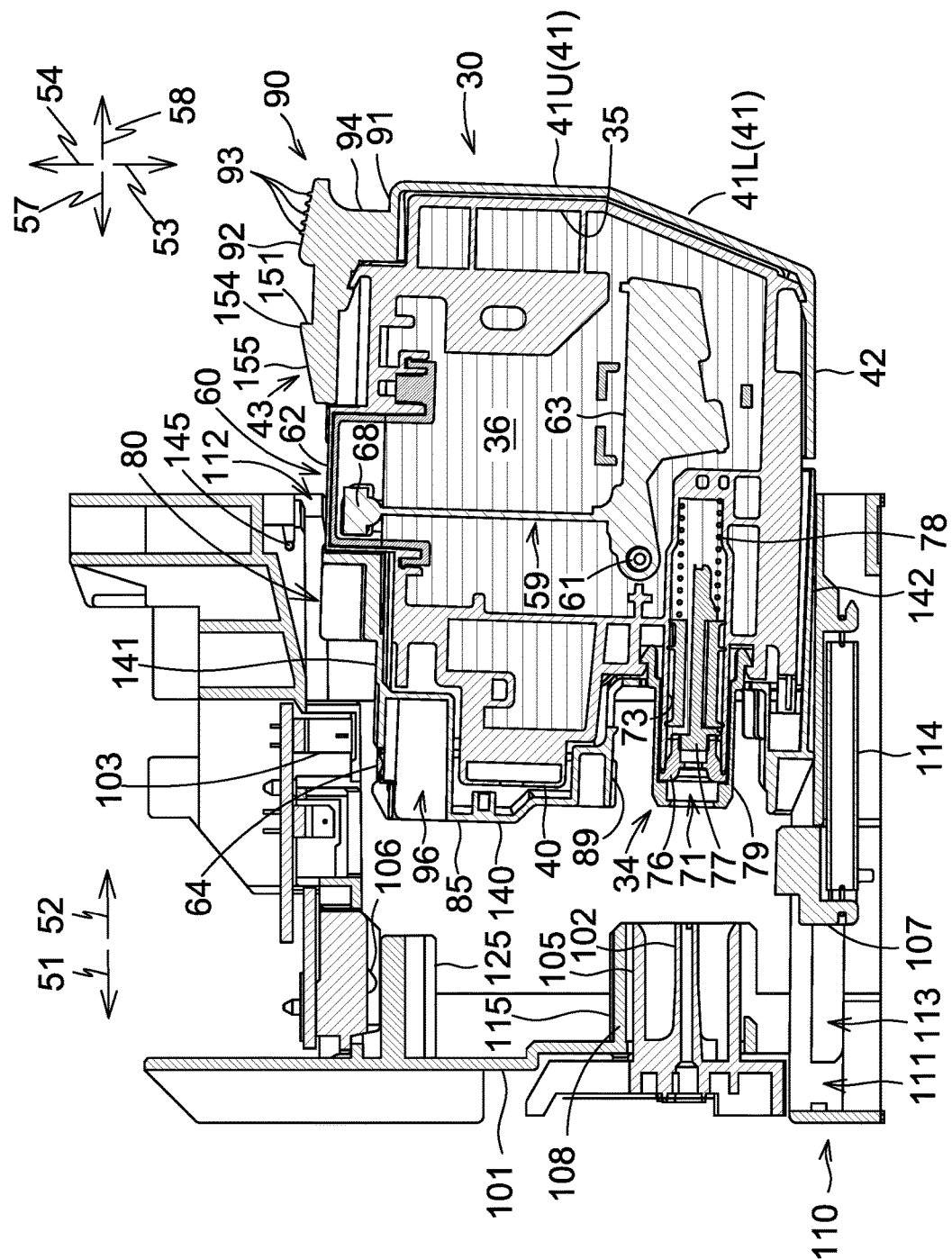
FIG. 7 is a longitudinal cross-sectional view of the ink cartridge and cartridge attaching unit, indicating a state in which the ink cartridge is started to be inserted into the cartridge attaching unit.

As illustrated in FIG. 2, the cartridge attaching unit 110 can accommodate four ink cartridges 30, which correspond to cyan, magenta, yellow, and black, in a case 101. In addition to the case 101, the cartridge attaching unit 110 includes an ink needle 102, a sensor 103, four contacts 106, a slider 107, and a locking portion 145 for each ink cartridge 30, as illustrated in FIGS. 2 and 7.

Case 101

The case 101, which covers the cartridge attaching unit 110, has a box-like shape that has a top surface that defines the top of the internal space of the case 101, a bottom surface that defines the bottom, a rear surface that links the top and bottom together, and the opening 112, which is formed at a position at which the opening 112 faces the rear surface in the insertion direction 51 and removal direction 52 and can be exposed to the surface of the user interface of the printer 10, the user facing the surface when the user uses the printer 10. The ink cartridge 30 is inserted into the case 101 and removed from it through the opening 112. When the upper edge and lower edge of the ink cartridge 30 are inserted into guide grooves 109 formed in the top surface and bottom surface, the ink cartridge 30 is guided in the insertion direction 51 and removal direction 52 in FIG. 7. In the case 101, three plates 104, which partition the internal space into four spaces, which are elongated vertically. One ink cartridge 30 is accommodated in each of these spaces partitioned by the plates 104.

Ink Needle 102

As illustrated in FIGS. 2 and 7, the ink needle (an example of a liquid supply tube) 102, which is made of a tubular resin, is provided at a lower portion of the rear surface of the case 101. The ink needle 102 is disposed at a position, on the rear surface of the case 101, at which the ink needle 102 corresponds to the ink supply portion 34 of the ink cartridge 30 attached to the cartridge attaching unit 110. The ink needle 102 protrudes from the rear surface of the case 101 in the removal direction 52.

A cylindrical guide 105 is provided around the ink needle 102. The guide 105 protrudes from the rear surface of the case 101 in the removal direction 52. The end of the protrusion is open. The ink needle 102 is disposed at the center of the guide 105. The guide 105 is shaped so that the ink supply portion 34 of the ink cartridge 30 advances inwardly.

Figure 10:
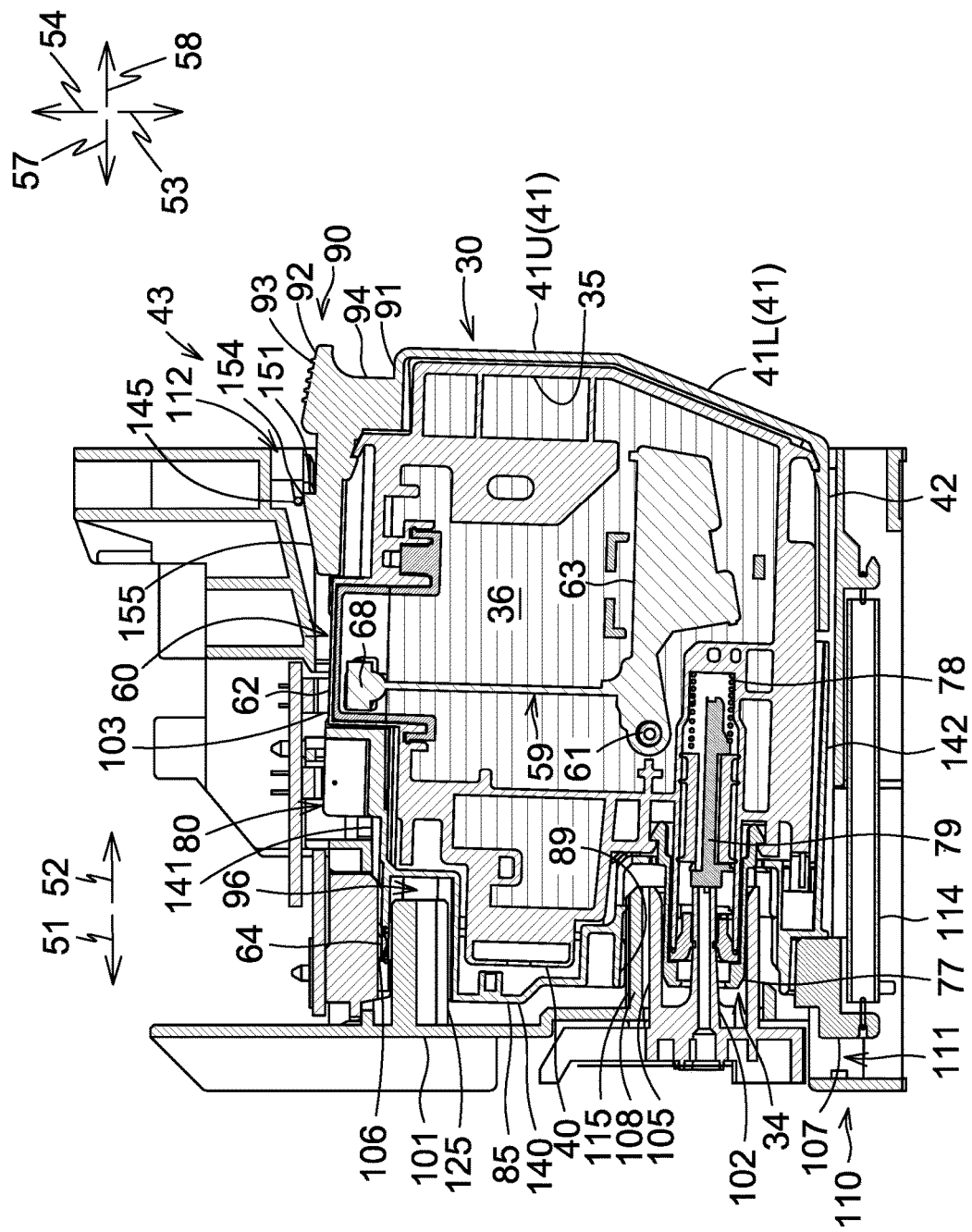
FIG. 10 is a longitudinal cross-sectional view of the ink cartridge and cartridge attaching unit, indicating a state in which an ink needle has entered an ink supply opening in the ink supply unit.

In the process of the insertion of the ink cartridge 30 into the cartridge attaching unit 110 in the insertion direction 51, that is, in the process of the movement of the ink cartridge 30 to the attached position, the ink supply portion 34 of the ink cartridge 30 enters the guide 105 (see FIG. 10). When the ink cartridge 30 is further inserted into the cartridge attaching unit 110 in the insertion direction 51, the ink needle 102 is inserted into an ink supply opening or outlet 71 formed in the ink supply portion 34. Thus, an ink supply valve 70 in the ink supply portion 34 is opened. As a result, the ink needle 102 and ink supply portion 34 are linked together. Then, ink retained in a retaining chamber 36 formed in the ink cartridge 30 flows into the ink tube 20 connected to the ink needle 102 through the internal space of a cylindrical wall 73 formed in the ink supply portion 34 and the internal space of the ink needle 102. The end of the ink needle 102 may be flat or pointed.

Slider 107

An opening 111 is formed below the lower surface of the lower guide groove 109 in the case 101 and at a position near the rear surface so as to extend in the insertion direction 51 (or removal direction 52). A slider 107 is provided in the opening 111. The slider 107 protrudes upwardly through the opening 111 from below the lower surface of the lower guide groove 109. The slider 107 engages a guide rail 113 provided at a lower portion of the case 101, and can move in the opening 111 in the insertion direction 51 and removal direction 52, along the guide rail 113. An extension spring 114 is extended between the slider 107 and the case 101. When the slider 107 is pulled, the extension spring 114 generates a biased force in the removal direction 52. In a state in which an external force is not applied to the slider 107, therefore, the slider 107 is positioned at the end of the guide rail 113 in the removal direction 52. When an external force is applied to the slider 107 at that position in the insertion direction 51, the slider 107 can move in the opening 111 in the insertion direction 51 along the guide rail 113.

Figure 8:
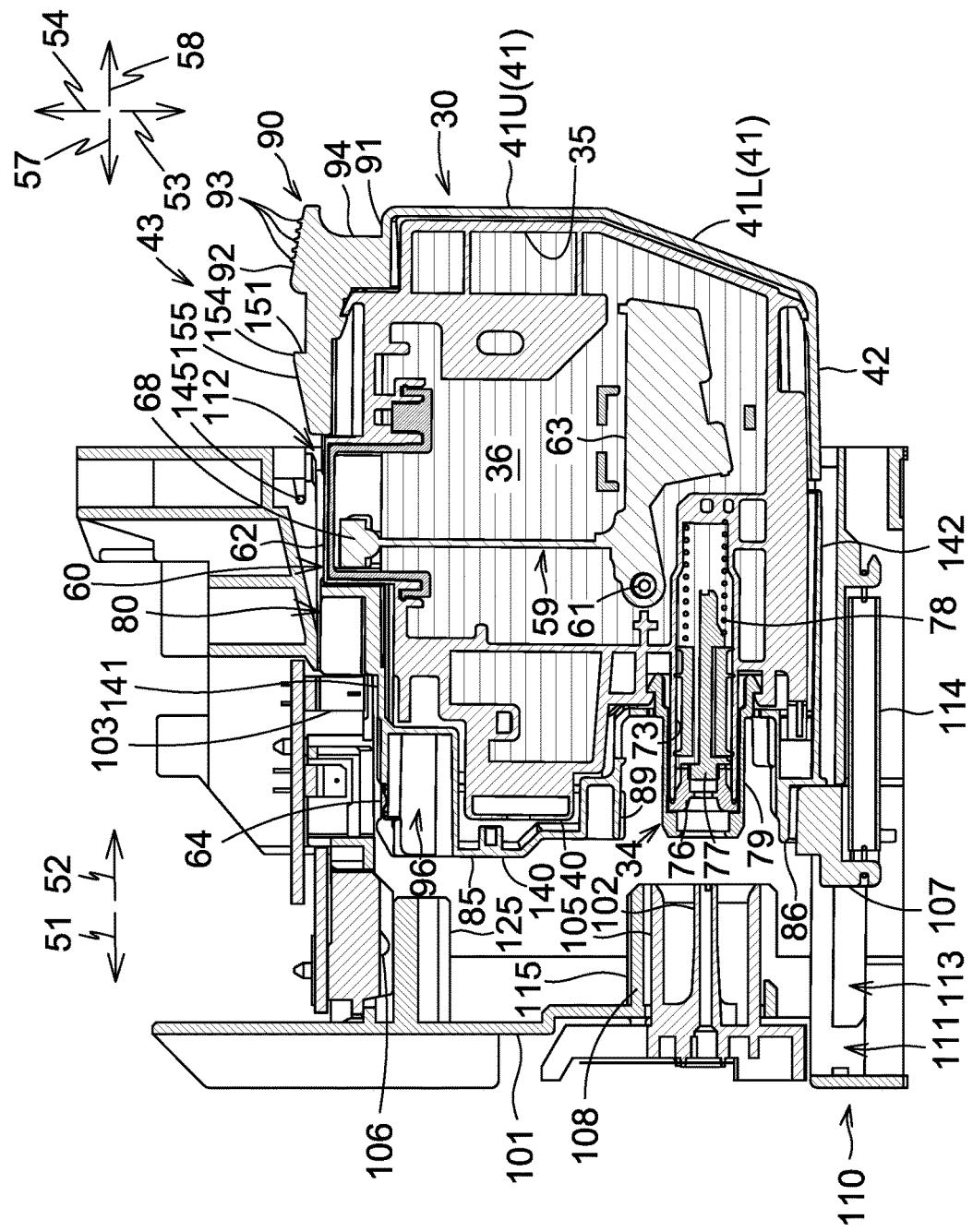
FIG. 8 is a longitudinal cross-sectional view of the ink cartridge and cartridge attaching unit, indicating a state in which a second protrusion is in contact with a slider.

In the process of the insertion of the ink cartridge 30 into the cartridge attaching unit 110 in the insertion direction 51, that is, in the process of the movement of the ink cartridge 30 to the attached position, a second protrusion 86 formed on the ink cartridge 30 advances in the insertion direction 51 along the lower guide groove 109 and comes into contact with the slider 107 (see FIG. 8). When the ink cartridge 30 is further inserted into the cartridge attaching unit 110 in the insertion direction 51, the ink cartridge 30 is pushed against the second protrusion 86, causing the slider 107 to move in the insertion direction 51 against the biased force of the extension spring 114. The slider 107 gives a biased force to the ink cartridge 30 in the removal direction 52. The slider 107 and extension spring 114 are an example of a biasing member.

Locking Portion 145

As illustrated in FIGS. 2 and 7, the locking portion 145 extends in the left direction 56 and right direction 55 of the case 101 in the vicinity of the top surface of the case 101 and in the vicinity of the opening 112. The locking portion 145 is a rod-like member extending in the left direction 56 and right direction 55. The locking portion 145 is, for example, a metal cylinder. Both ends of the locking portion 145 in the left direction 56 and right direction 55 are secured to walls that define both ends of the case 101 in the left direction 56 and right direction 55. Therefore, the locking portion 145 does not relatively rotate with respect to the case 101, nor does it cause other relative motion. The locking portion 145 extends in the left direction 56 and right direction 55 across the four spaces in which four ink cartridges 30 can be accommodated. In each space in which the ink cartridge 30 is accommodated, a space is present around the locking portion 145. Therefore, the ink cartridge 30 can access the locking portion 145 toward the upward direction 54 or removal direction 52.

The locking portion 145 holds the ink cartridge 30 attached to the cartridge attaching unit 110 at the attached position. When the ink cartridge 30 is inserted into the cartridge attaching unit 110 and is rotated to an attachment orientation, the ink cartridge 30 engages the locking portion 145. The locking portion 145 holds the ink cartridge 30 in the cartridge attaching unit 110 against a force with which the slider 107 presses the ink cartridge 30 in the removal direction 52 and a force with which a coiled spring 78 provided in the ink cartridge 30 presses the ink cartridge 30 in the removal direction 52.

As illustrated in FIGS. 2 and 7, four contacts 106 are provided on the top surface of the case 101 in the vicinity of its rear surface. Although not illustrated in detail in these drawings, the four contacts 106 are mutually spaced apart in the left direction 56 and right direction 55. In the ink cartridge 30, the four contacts 106 are positioned in correspondence to four electrodes 65, which will be described later with reference to FIGS. 3A and 4A. Each contact 106 is formed with a conductive and elastic material; the contact 106 is deformable in the upward direction 54. Four sets of four contacts 106 are provided in correspondence to four ink cartridges 30 that can be accommodated in the case 101. There is no limitation on the number of contacts 106 and the number of electrodes 65; any number of contacts 106 and any number of electrodes 65 can be used.

Each contact 106 is electrically connected to a computational unit with an electric circuit intervening between them. The computational unit includes, for example, a central processing unit (CPU), a read-only memory (ROM), and a random-access memory (RAM). The computational unit may be configured as a control unit for the printer 10. When the contact 106 and its corresponding electrode 65 are electrically connected to each other, a voltage Vc is applied to the electrode 65, the electrode 65 is grounded, or electric power is supplied to the electrode 65. Due the electrical connection between the contact 106 and its corresponding electrode 65, it is possible to access data stored in an integrated circuit (IC) in the ink cartridge 30. An output from the electric circuit is entered into the computational unit.

Rod 125

As illustrated in FIGS. 2 and 7, a rod 125 is provided on the rear surface of the case 101 at a position above the ink needle 102. The rod 125 protrudes from the rear surface of the case 101 in the removal direction 52. The cross-section of the rod 125 in a direction orthogonal to the removal direction 52 has an inverted U shape like an upper half of a cylindrical shape. A rib protrudes upwardly from the topmost position of the rod 125 in the removal direction 52. With the ink cartridge 30 attached to the cartridge attaching unit 110, that is, with the ink cartridge 30 being at the attached position, the rod 125 is inserted into a recess 96 formed below an IC board 64 in the ink cartridge 30.

Sensor 103

As illustrated in FIGS. 2 and 7, a sensor 103 is provided on the top surface of the case 101. The sensor 103 has a light emitting portion and a photosensitive portion. The light emitting portion is disposed to the right of the photosensitive portion in the right direction 55 or to the left of it in the left direction 56 with a space between them. Upon completion of the attachment of the ink cartridge 30 to the cartridge attaching unit 110, a light access portion 62 provided in the ink cartridge 30 is located between the light emitting portion and the photosensitive portion. In other words, the light emitting portion and photosensitive portion are oppositely disposed in a state in which, between them, the light access portion 62 in the ink cartridge 30 inserted into the cartridge attaching unit 110 is placed.

The sensor 103 outputs a different detection signal depending on whether light emitted from the light emitting portion has been received by the photosensitive portion. When, for example, the photosensitive portion could not receive light emitted from the light emitting portion (that is, the light receiving intensity of the photosensitive portion is lower than a predetermined intensity), the sensor 103 outputs a low-level signal, the signal level of which is lower than a threshold level. When the photosensitive portion could receive light emitted from the light emitting portion (that is, the light receiving intensity of the photosensitive portion is equal to or higher than the predetermined intensity), the sensor 103 outputs a high-level signal, the signal level of which is equal to or higher than the threshold level.

A positioning member 108 extends above the guide 105 and below the rod 125 in the left direction 56 and right direction 55 of the case 101. The positioning member 108 protrudes from the rear surface of the case 101 in the removal direction 52. The dimension of the positioning member 108 by which it protrudes from the rear surface of the case 101 in the removal direction 52 is smaller than the dimension of the guide 105 by which it protrudes from the rear surface of the case 101 in the removal direction 52. The upper surface 115 of the positioning member 108 is in contact with the lower surface 89 of a first protrusion 85 in the ink cartridge 30 attached to the cartridge attaching unit 110.

Ink Cartridge 30

The ink cartridge 30 illustrated in FIGS. 3A and 3B to FIG. 6 is a vessel in which ink is retained. A space formed in the ink cartridge 30 is the retaining chamber 36. The retaining chamber 36 is formed with an internal frame 35 placed in a rear cover 31 and a front cover 32, which form the outside shape of the ink cartridge 30. The internal frame 35 is an example of a main body. The rear cover 31, front cover 32, and internal frame 35 are an example of a case.

The orientation of the ink cartridge 30 illustrated in FIGS. 3A and 3B to FIG. 6 and FIGS. 15A and 15B is an orientation taken when the ink cartridge 30 is in the attached orientation (first orientation). The ink cartridge 30 has a front surface 140, a rear surface 41, upper surfaces 39 and 141, and lower surfaces 42 and 142, as described later. In the orientation of the ink cartridge 30 illustrated in FIGS. 3A and 3B to FIG. 6, a direction extending from the rear surface 41 toward the front surface 140 matches the insertion direction 51 and forward direction 57, a direction extending from the front surface 140 toward the rear surface 41 matches the removal direction 52, a direction extending from the upper surfaces 39 and 141 toward the lower surfaces 42 and 142 matches the downward direction 53, and a direction extending from the lower surfaces 42 and 142 toward the upper surfaces 39 and 141 matches the upward direction 54. With the ink cartridge 30 attached to the cartridge attaching unit 110, the front surface 140 faces in the insertion direction 51 and in the forward direction 57, the rear surface 41 faces the removal direction 52, the lower surfaces 42 and 142 face the downward direction 53, and the upper surfaces 39 and 141 face the upward direction 54.

As illustrated in FIGS. 3A and 3B to FIG. 6, the ink cartridge 30 is formed with the rear cover 31, which has a substantially rectangular parallelepiped shape, the front cover 32, which includes the front surface 140, and the internal frame 35, which defines the retaining chamber 36. The rear cover 31 and front cover 32 are combined together, forming the outside shape of the ink cartridge 30. The internal frame 35 is placed inside the combined rear cover 31 and front cover 32. The ink cartridge 30 is flat as a whole; the dimension in the right direction 55 and left direction 56 is small, and the dimension in the downward direction 53 and upward direction 54 and the dimension in the forward direction 57 and backward direction 58 are larger than the dimension in the right direction 55 and left direction 56. The front surface 140 is a surface, of the front cover 32, that faces in the insertion direction 51 (the forward direction 57) when the ink cartridge 30 is inserted into the cartridge attaching unit 110. The rear surface 41 is a surface, of the rear cover 31, that faces the removal direction 52 (58) when the ink cartridge 30 is inserted into the cartridge attaching unit 110. That is, the rear surface 41 is disposed opposite to the front surface 140 of the front cover 32 with the retaining chamber 36 intervening between them.

Rear Cover 31

As illustrated in FIGS. 3A and 3B and FIGS. 4A and 4B, the rear cover 31 is formed like a box with side surfaces 37 and 38, which are mutually spaced apart in the right direction 55 and left direction 56, the upper surface 39 facing in the upward direction 54, and the lower surface 42 facing in the downward direction 53, the upper surface 39 and lower surface 42 extending from the rear surface 41 in the insertion direction 51. The rear cover 31 has an opening facing in the forward direction 57. The internal frame 35 is inserted into the rear cover 31 through the opening. That is, the rear cover 31 covers the rear of the internal frame 35. With the internal frame 35 inserted, the lower surface 42 is disposed opposite to the upper surface 39 with the retaining chamber 36 intervening between them.

Figure 15B:
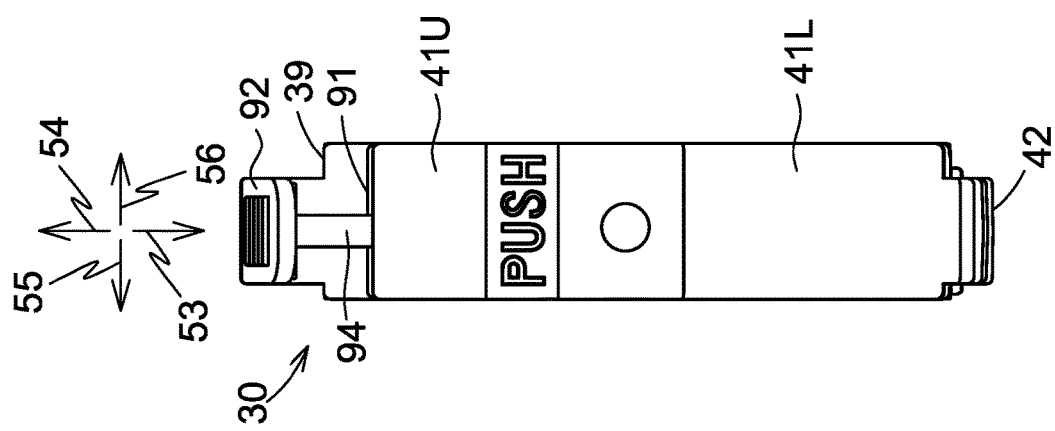
FIG. 15B is a back view of the ink cartridge when viewed forwardly.

The rear surface 41 has an upper portion 41U and a lower portion 41L. The upper portion 41U is positioned above the lower portion 41L in the upward direction 54. The lower portion 41L is positioned below the upper portion 41U in the downward direction 53. In other words, the lower portion 41L is positioned from the upper portion 41U in the forward direction 57. Both the upper portion 41U and the lower portion 41L are a flat surface; they cross each other, but they are not orthogonal to each other. The lower portion 41L is inclined with respect to the downward direction 53 and upward direction 54 so that as the lower portion 41L approaches the lower surface 42, the lower portion 41L approaches the front surface 140. To prompt the user to push the ink cartridge 30, a sheet is pasted to the upper portion 41U, as illustrated in FIG. 15B, to indicate PUSH or another character string, a symbol such as an arrow, a figure indicating a push with a finger, or the like.

Figure 3A:
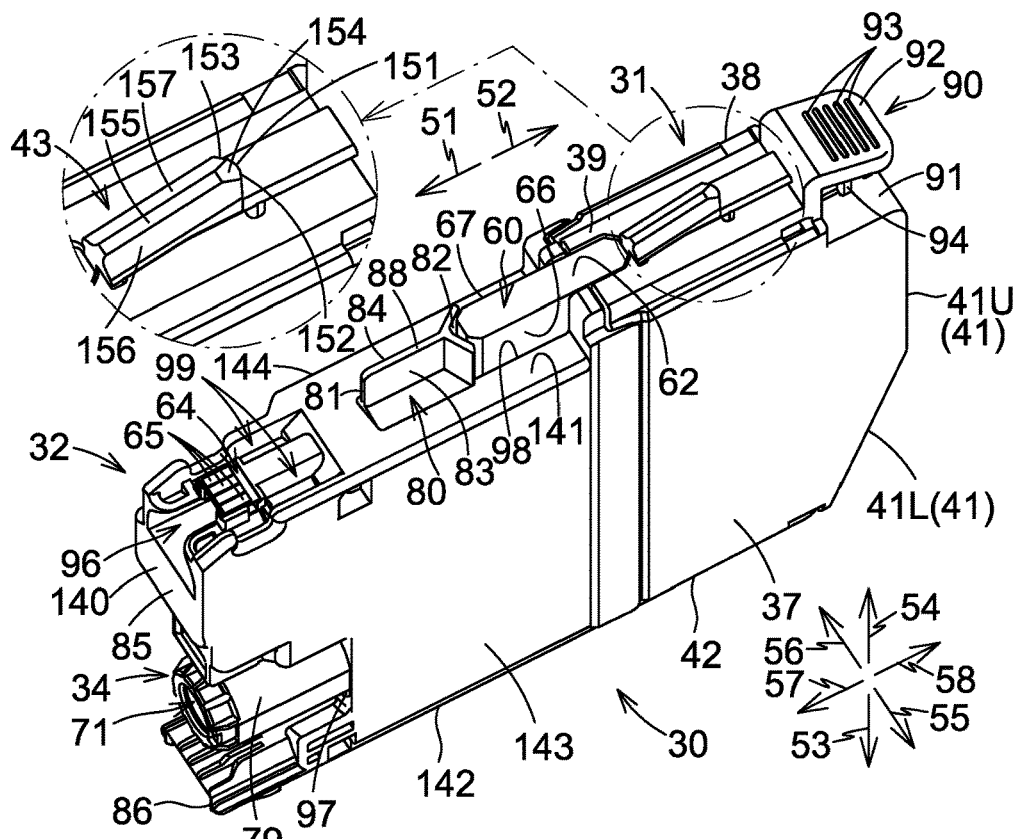
FIG. 3A is a perspective view illustrating the outside shape of an ink cartridge when viewed from the front and above.
Figure 3B:
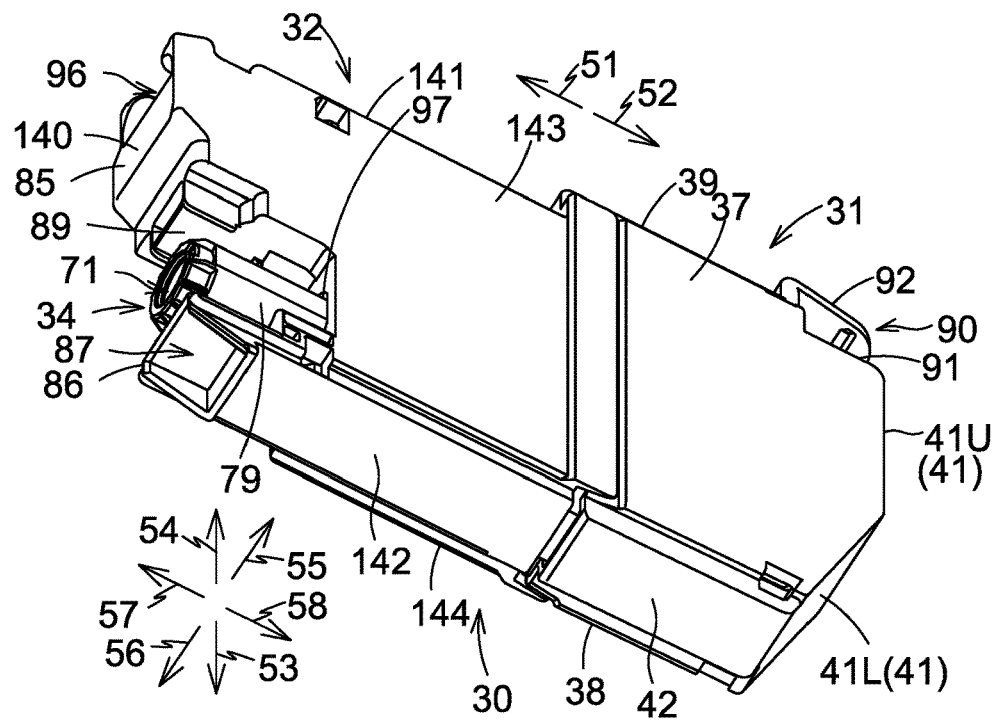
FIG. 3B is a perspective view illustrating the outside shape of the ink cartridge when viewed from the front and below.
Figure 4A:
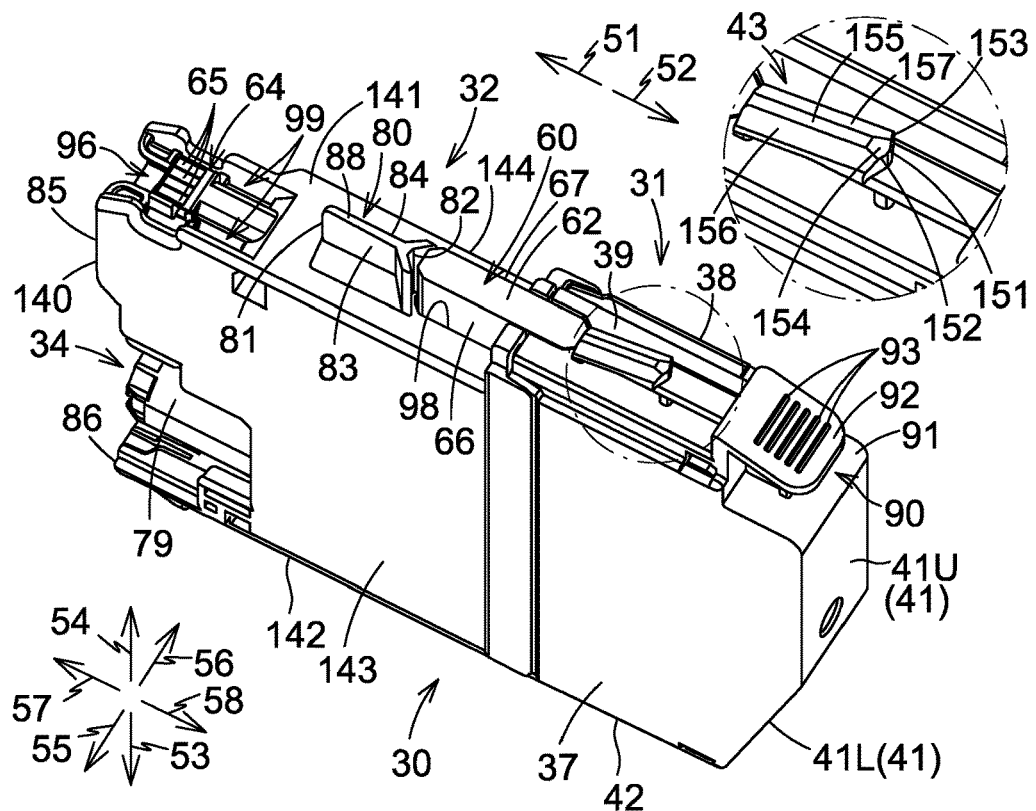
FIG. 4A is a perspective view illustrating the outside shape of the ink cartridge when viewed from the back and above.
Figure 4B:
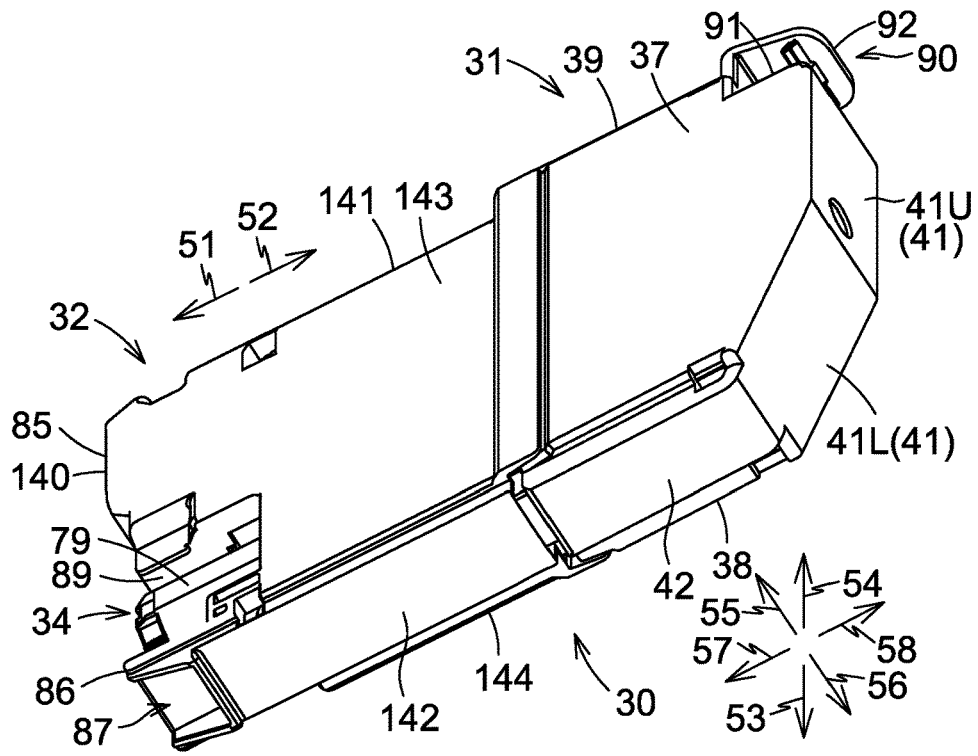
FIG. 4B is a perspective view illustrating the outside shape of the ink cartridge when viewed from the back and below.
Figure 5:
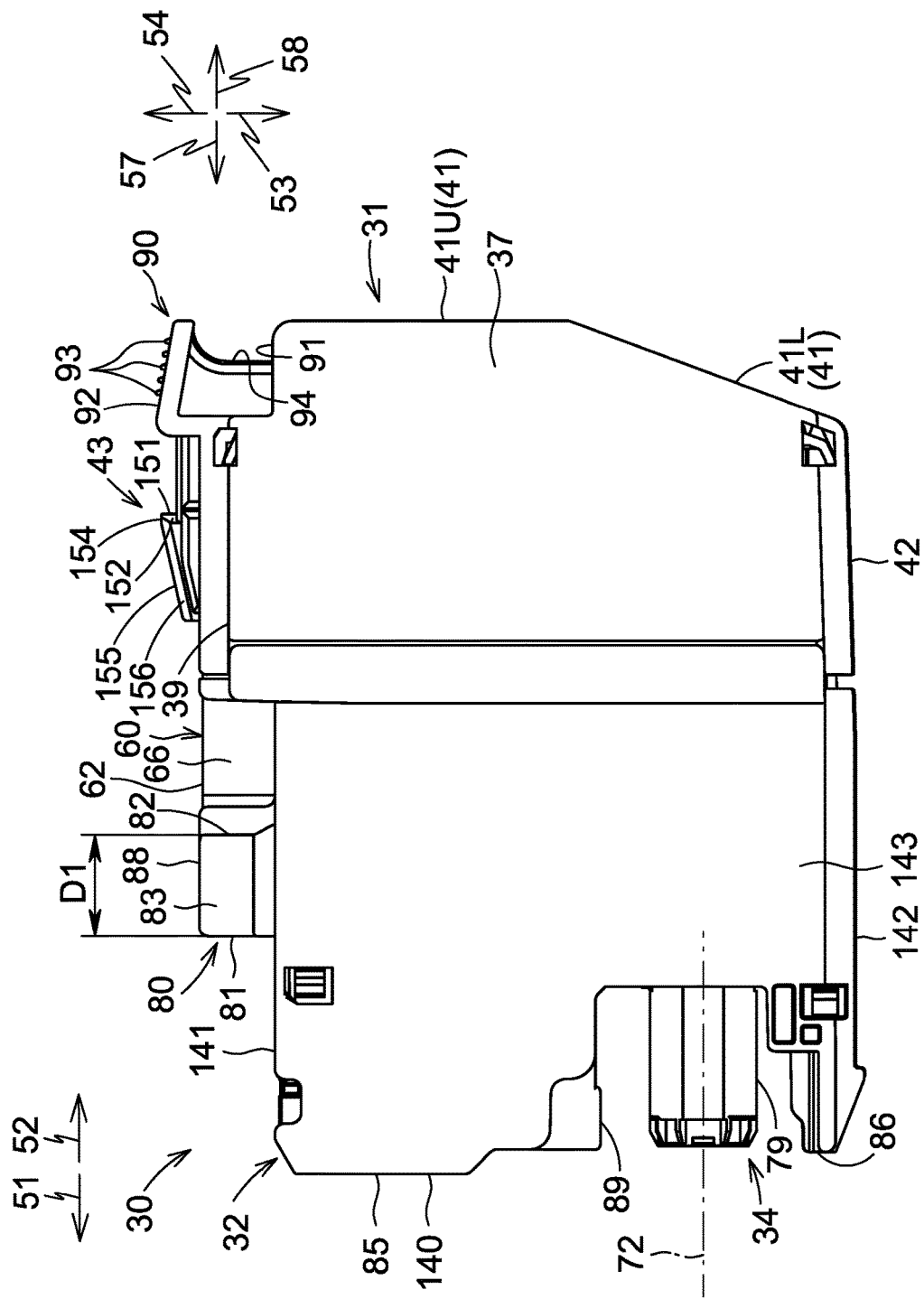
FIG. 5 is a side view of the ink cartridge.

As illustrated in FIGS. 3A and 4A, a protrusion 43 is formed on the upper surface 39 of the rear cover 31. The protrusion 43 extends in the forward direction 57 and backward direction 58 from the center of the upper surface 39 in the right direction 55 and left direction 56. A surface, of the protrusion 43, that faces in the backward direction 58 is a locking surface 151. The locking surface 151 extends in the downward direction 53 and upward direction 54. With the ink cartridge 30 attached to the cartridge attaching unit 110, the locking surface 151 can be brought into contact with the locking portion 145 in the removal direction 52. When the locking surface 151 is brought into contact with the locking portion 145 in the removal direction 52, the ink cartridge 30 is held in the cartridge attaching unit 110 against a force with which the ink cartridge 30 is biased by the extension spring 114 through the slider 107 and a force with which the ink cartridge 30 is biased by the coiled spring 78.

A reinforcing surface 152 extends that crosses the locking surface 151 so as to be continued to the end of the locking surface 151 in the right direction 55. A reinforcing surface 153 extends that crosses the locking surface 151 so as to be continued to the end of the locking surface 151 in the left direction 56. The reinforcing surface 152 extends in the forward direction 57 so as to form an acute angle with respect to a virtual surface that includes the locking surface 151 and extends in the downward direction 53 and upward direction 54 and in the right direction 55. The reinforcing surface 153 extends in the forward direction 57 so as to form an acute angle with respect to a virtual surface that includes the locking surface 151 and extends in the downward direction 53 and upward direction 54 and in the left direction 56. Due to the reinforcing surfaces 152 and 153, the strength of the protrusion 43 is increased, reducing the risk of damage to the locking surface 151. Since the reinforcing surfaces 152 and 153 do not extend beyond the locking surface 151 in the backward direction 58, they do not come into contact with the locking portion 145. Even if the locking surface 151 slides on the locking portion 145, therefore, the presence of the reinforcing surfaces 152 and 153 do not increase sliding resistance.

On the protrusion 43, a horizontal surface 154 is provided so as to extend from the locking surface 151 in the forward direction 57. The horizontal surface 154 extends in the right direction 55 and left direction 56 and in the forward direction 57 and backward direction 58. An inclined surface 155 is provided so as to extend from the horizontal surface 154 in the forward direction 57. The inclined surface 155 faces in the upward direction 54 and in the forward direction 57. Therefore, the inclined surface 155 is visible when the ink cartridge 30 is viewed in the downward direction 53, and also visible when the ink cartridge 30 is viewed in the backward direction 58. Since the locking surface 151 is continued to the inclined surface 155 through the horizontal surface 154, a boundary between the locking surface 151 and the horizontal surface 154 does not become a pointed convex shape. In the process of the insertion of the ink cartridge 30 into the cartridge attaching unit 110, the locking portion 145 is smoothly guided by the inclined surface 155 and horizontal surface 154 beyond the locking surface 151 in the backward direction 58 while the locking portion 145 is in contact with the inclined surface 155 and horizontal surface 154.

A reinforcing surface 156 extends that crosses the locking surface 151 so as to be continued to the end of the inclined surface 155 in the right direction 55. A reinforcing surface 157 extends that crosses the locking surface 151 so as to be continued to the end of the inclined surface 155 in the left direction 56. The reinforcing surface 156 extends in the downward direction 53 so as to form an acute angle with respect to a virtual surface that includes the inclined surface 155 and extends in the right direction 55. The reinforcing surface 157 extends in the downward direction 53 so as to form an acute angle with respect to a virtual surface that includes the inclined surface 155 and extends in the left direction 56. Due to the reinforcing surfaces 156 and 157, the strength of the protrusion 43 is increased, reducing the risk of damage to the inclined surface 155. Since the reinforcing surfaces 156 and 157 do not extend beyond the inclined surface 155 in the upward direction 54, they do not come into contact with the locking portion 145. Therefore, the presence of the reinforcing surfaces 156 and 157 do not increase sliding resistance during the sliding of the inclined surface 155 on the locking portion 145.

On the upper surface 39 of the rear cover 31, a manipulation portion 90 is displaced from the locking surface 151 in the backward direction 58. At the rear end of the upper surface 39 of the rear cover 31, a sub-upper surface 91 is formed below other portions of the upper surface 39 in the downward direction 53. The manipulation portion 90 is disposed above the sub-upper surface 91 with a space between them. The manipulation portion 90 is shaped like a flat plate so that the manipulation portion 90 protrudes beyond the protrusion 43 in the upward direction 54 from the vicinity of a boundary between the sub-upper surface 91 and other portions of the upper surface 39 and is then bent diagonally in the backward direction 58 and in the downward direction 53. A rib 94 is provided between the manipulation portion 90 and the sub-upper surface 91; the rib 94 is continued to the manipulation portion 90 and sub-upper surface 91 and extends in the backward direction 58. As illustrated in FIG. 15, the dimension of the rib 94 in the right direction 55 and left direction 56 is smaller than the sizes of the manipulation portion 90 and sub-upper surface 91 in the right direction 55 and left direction 56.

The manipulation portion 90 has a manipulation surface 92 that faces in the upward direction 54 and in the backward direction 58. The manipulation surface 92 and sub-upper surface 91 are disposed at the same position in the forward direction 57 and backward direction 58. In other words, when the ink cartridge 30 is viewed in the downward direction 53, the manipulation surface 92 and sub-upper surface 91 are is disposed at the same position. The manipulation surface 92 has a plurality of protrusions, which are, for example, a plurality of ridges 93 that extend in the right direction 55 and left direction 56, and are mutually spaced apart in the forward direction 57 and backward direction 58. Due to the ridges 93 working as a plurality of protrusions, the user can easily recognize the manipulation surface 92. In addition, when the user manipulates the manipulation surface 92 with a finger, the finger does not easily slide on the manipulation surface 92.

As illustrated in FIG. 15, when the manipulation surface 92 is visible when the ink cartridge 30 is viewed in the downward direction 53, and also visible when the ink cartridge 30 is viewed in the forward direction 57. In other words, the manipulation surface 92 is visible when the ink cartridge 30 is viewed in a direction proceeding from the upper surface 39 toward the lower surface 42, and also visible when the ink cartridge 30 is viewed from a direction proceeding from the rear surface 41 toward the front surface 140. The manipulation surface 92 is manipulated by the user when the user takes out the ink cartridge 30 attached to the cartridge attaching unit 110. The manipulation portion 90 is secured to the rear cover 31 by, for example, being molded together with the rear cover 31, so the manipulation portion 90 does not relatively rotate with respect to the rear cover 31, nor does it cause other relative motion. Therefore, a force given by the user to the manipulation surface 92 is transmitted to the rear cover 31 as is, without changing the direction. In this embodiment, the manipulation portion 90 does not also relatively rotate with respect to the internal frame 35 and retaining chamber 36, nor does it cause other relative motion.

Front Cover 32

As illustrated in FIGS. 3A and 3B and FIGS. 4A and 4B, the front cover 32 is formed like a box that has side surfaces 143 and 144, which extend from the front surface 140 in the backward direction 58 and are mutually spaced apart in the right direction 55 and left direction 56 and also has the upper surface 141 and lower surface 142, which extend from the front surface 140 in the backward direction 58 and are mutually spaced apart in the downward direction 53 and upward direction 54. The front cover 32 has an opening facing in the backward direction 58. The internal frame 35 is inserted into the front cover 32 through the opening. That is, the front cover 32 covers a front, of the internal frame 35, that is not covered by the rear cover 31.

In a state in which the rear cover 31 and front cover 32 are combined together, that is, the ink cartridge 30 is assembled, the upper surface 141 of the front cover 32 forms the upper surface of the ink cartridge 30 together with the upper surface 39 of the rear cover 31, and the lower surface 142 of the front cover 32 forms the lower surface of the ink cartridge 30 together with the lower surface 42 of the rear cover 31. Specifically, when the ink cartridge 30 is placed in the attached orientation (first orientation), the lower surface 142 of the front cover 32 extends in the forward direction 57 and backward direction 58, and the lower surface 42 of the rear cover 31 is inclined in the downward direction 53 and in the backward direction 58. The side surfaces 143 and 144 of the front cover 32 form the side surfaces of the ink cartridge 30 together with the side surfaces 37 and 38 of the rear cover 31. In a state in which the ink cartridge 30 is assembled, the front surface 140 of the front cover 32, the front surface 140 forming the front surface of the ink cartridge 30, and the rear surface 41 of the rear cover 31, the rear surface 41 forming the rear surface of the ink cartridge 30, are mutually spaced apart in the forward direction 57 and backward direction 58. The front surface, rear surface, upper surface, lower surface, and side surfaces of the ink cartridge 30 each are not necessarily a single plane. That is, the front surface is a surface that is visible when the ink cartridge 30 placed in the first orientation is viewed in the backward direction 58 and the front surface is displaced from the center of the ink cartridge 30 placed in the first orientation in the forward direction 57; the rear surface is a surface that is visible when the ink cartridge 30 placed in the first orientation is viewed in the forward direction 57 and the rear surface is displaced from the center of the ink cartridge 30 placed in the first orientation in the backward direction 58; the upper surface is a surface that is visible when the ink cartridge 30 placed in the first orientation is viewed in the downward direction 53 and the upper surface is displaced from the center of the ink cartridge 30 placed in the first orientation in the upward direction 54; the lower surface is a surface that is visible when the ink cartridge 30 placed in the first orientation is viewed in the upward direction 54 and the lower surface is positioned below the center of the ink cartridge 30 placed in the first orientation in the downward direction 53. This is also true for the side surfaces. That is, although, in this embodiment, the upper surface 39, which is part of the rear cover 31, is positioned above the upper surface 141, which is part of the front cover 32, this is not a limitation; the upper surfaces 141 and 39 may be at the same position in the downward direction 53 and upward direction 54.

The recess 96, which is recessed in the backward direction 58, is formed at an upper portion of the front surface 140 of the front cover 32. With the ink cartridge 30 attached to the cartridge attaching unit 110, the rod 125 enters the recess 96. Therefore, the cross-section of the recess 96 in a direction orthogonal to the forward direction 57 and backward direction 58 has a shape corresponding to the shape of the cross-section of the rod 125. The recess 96 extends from the front surface 140 in the backward direction 58. Two recesses 99, which are recessed from the upper surface 141 in the downward direction 53, are displaced from the IC board 64 in the backward direction 58. One of the recesses 99 extends from the IC board 64 in the right direction 55, and the other extends from the IC board 64 in the left direction 56. With the ink cartridge 30 attached to the cartridge attaching unit 110, the rod 125 enters a space defined by the recess 96.

A hole 97, which passes through the front cover 32 in the backward direction 58, is formed at a lower portion of the front surface 140 of the front cover 32. With the internal frame 35 inserted into the front cover 32, the hole 97 is a hole through which the ink supply portion 34 in the internal frame 35 is exposed to the outside. Therefore, the hole 97 is formed so as to correspond to the position, dimensions, and shape of the ink supply portion 34 in the internal frame 35.

The first protrusion 85 and second protrusion 86 are formed on the front surface 140 of the front cover 32. The first protrusion 85 protrudes from the upper end of the front cover 32 in the forward direction 57. The recess 96 is formed at the end of the first protrusion 85. The end of the first protrusion 85 forms part of the front surface 140. The lower surface 89 of the first protrusion 85 is positioned between the IC board 64 and the ink supply portion 34 ink in the downward direction 53 and upward direction 54. With the ink cartridge 30 attached to the cartridge attaching unit 110, the lower surface 89 is in contact with the upper surface 115 of the positioning member 108 in the cartridge attaching unit 110. The lower surface 89 is equivalent to a positioning surface.

The second protrusion 86 protrudes from the front surface 140 in the forward direction 57 at the lower end of the front surface 140 of the front cover 32, that is, below the ink supply portion 34. A recess 87, which is open in the forward direction 57 and in the downward direction 53, is formed in the lower surface of the second protrusion 86. Part of the recess 87 protrudes from the lower surface 142 of the front cover 32 in the downward direction 53. In the process of the insertion of the ink cartridge 30 into the cartridge attaching unit 110, the slider 107 enters the recess 87 of the second protrusion 86 and comes into contact with it.

A hole 98 (an example of an opening), which passes through the front cover 32 in the downward direction 53, is formed in the upper surface 141 of the front cover 32. With the internal frame 35 inserted into the front cover 32, the hole 98 is a hole through which the light access portion 62 in the internal frame 35 is exposed to the outside. Therefore, the hole 98 is formed so as to correspond to the position, dimensions, and shape of the light access portion 62 in the internal frame 35.

Although, in this embodiment, an opening (hole 98) is formed in the front cover 32 so as to expose the light access portion 62 in the internal frame 35 from the upper surface 141, an opening through which the light access portion 62 is exposed may be formed in only one of the front cover 32 and rear cover 31 or may be formed in both the front cover 32 and the rear cover 31. Although, in this embodiment, the hole 98 is formed so that a portion behind the light access portion 62 is covered with the rear cover 31, the hole 98 may be formed so that the whole of the light access portion 62 is exposed.

The IC board 64 is mounted on the upper surface 141 of the front cover 32 and above the first protrusion 85, that is, above the ink supply portion 34. The IC board 64 is electrically connected to the four contacts 106 (see FIG. 2) aligned in the right direction 55 and left direction 56 in the middle of the ink cartridge 30 being attached to the cartridge attaching unit 110. In a state as well in which the ink cartridge 30 attached to the cartridge attaching unit 110, the IC board 64 is electrically connected to the contacts 106. A dimension of the circuit board 64 in the first direction 51 is smaller than a dimension of the circuit board 64 in left direction 56 and the right direction 55.

On the IC board 64, an IC (not illustrated in each drawing) and four electrodes 65 are mounted. The four electrodes 65 are aligned in the right direction 55 and left direction 56. The IC, which is a semiconductor integrated circuit, stores information about the ink cartridge 30 such as a lot number, a date and time of manufacturing, and data indicating ink colors and other information in such a way that the information can be read.

The electrodes 65 are electrically connected to the IC. Each electrode 65 extends in the forward direction 57 and backward direction 58. The four electrodes 65 are mutually spaced apart in the right direction 55 and left direction 56. Each electrode 65 is exposed to the upper surface of the IC board 64 so as to be accessed. The electrode 65 is an example of an electric interface.

Internal Frame 35

Although not illustrated in each drawing, the internal frame 35 is annularly structured with a pair of end surfaces open in the right direction 55 and left direction 56. The pair of open end surfaces of the internal frame 35 are sealed with films (not illustrated), forming the retaining chamber 36 in which ink can be retained. A front surface 40, which defines the retaining chamber 36, faces the rear surface of the front surface 140 of the front cover 32 when the internal frame 35 is inserted into the front cover 32. The ink supply portion 34 is disposed below the front surface 40.

Ink Supply Portion 34

Figure 6:
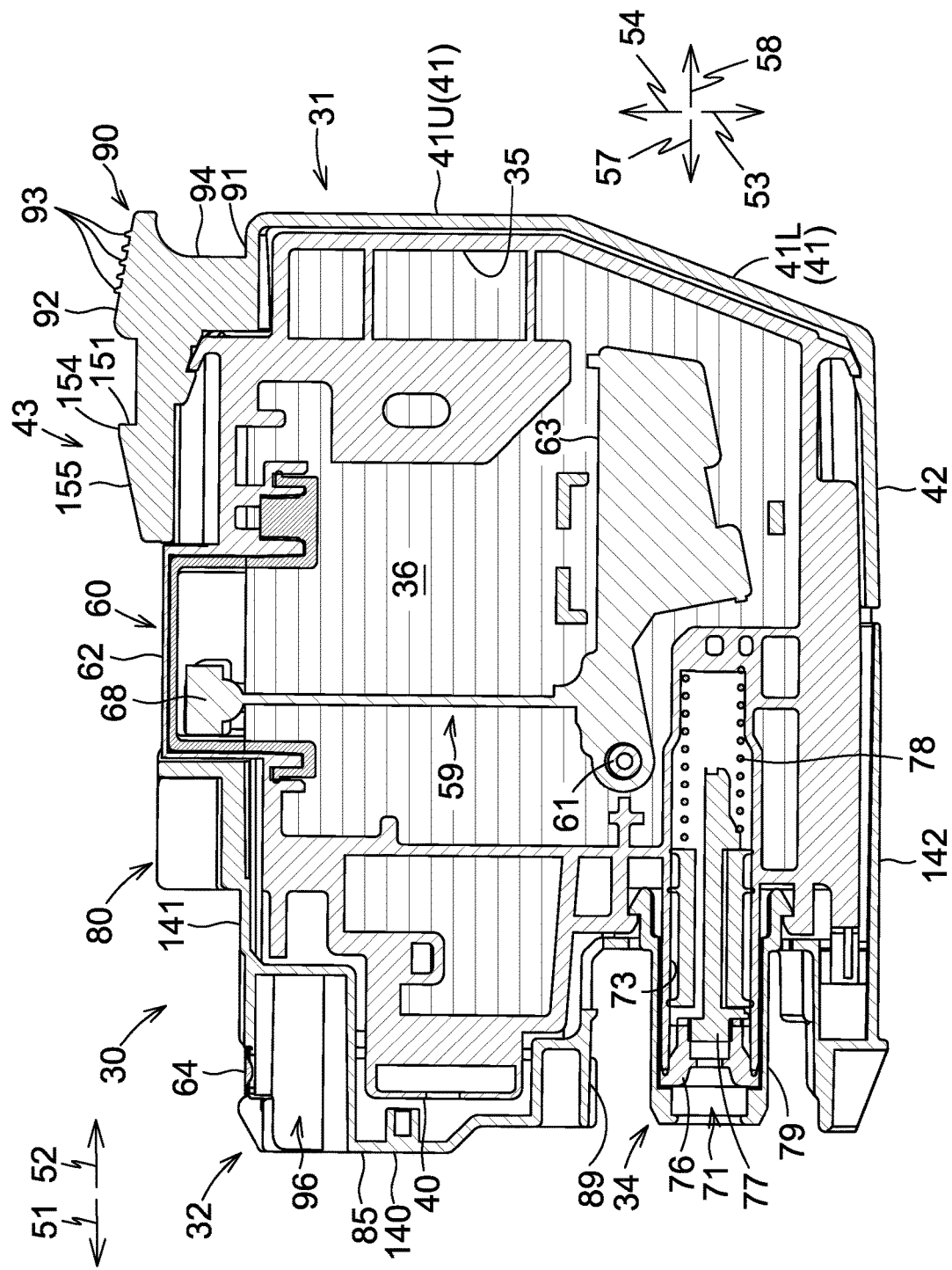
FIG. 6 is a longitudinal cross-sectional view illustrating the internal structure of the ink cartridge.

As illustrated in FIG. 6, the ink supply portion 34 is disposed at a lower portion of the front surface 140 so as to protrude beyond the front surface 40 of the internal frame 35 in the forward direction 57. The ink supply portion 34 has a cylindrical outside shape and protrudes toward the outside through the hole 97 formed in the front surface 140 of the front cover 32. The ink supply portion 34 has the cylindrical wall 73 in a cylindrical shape having an internal space and also has a sealing member 76 and a cap 79, which are attached to the cylindrical wall 73.

The cylindrical wall 73 extends from the interior of the retaining chamber 36 to the outside. The end of the cylindrical wall 73 in the removal direction 52 is open in the retaining chamber 36. The end of the cylindrical wall 73 in the insertion direction 51 is open to the outside of the ink cartridge 30. Thus, the cylindrical wall 73 communicates with the retaining chamber 36 and the outside of the ink cartridge 30 through the internal space. That is, the ink supply portion 34 provides an outlet that supplies ink retained in the retaining chamber 36 to the outside of the ink cartridge 30 through the internal space of the cylindrical wall 73. The sealing member 76 and cap 79 are attached to the end of the cylindrical wall 73 in the insertion direction 51.

A valve body 77 and the coiled spring 78 are accommodated in the internal space of the cylindrical wall 73. The valve body 77 and coiled spring 78 are used to selectively switch the state of the ink supply portion 34 between a state in which ink flows from the retaining chamber 36 to the outside of the ink cartridge 30 through the internal space of the cylindrical wall 73 (see FIG. 11) and a state in which ink does not flow from the retaining chamber 36 to the outside of the ink cartridge 30 through the internal space of the cylindrical wall 73 (see FIG. 6).

When the valve body 77 moves in the forward direction 57 and backward direction 58, the ink supply opening 71, which is a through hole formed at the center of the sealing member 76, is opened and closed. The coiled spring 78 biases the valve body 77 in the forward direction 57. In a state in which an external force is not applied, therefore, the valve body 77 closes the ink supply opening 71 in the sealing member 76.

The sealing member 76 is disposed at the end of the cylindrical wall 73. The sealing member 76 is a discoid member having a through hole at the center. The sealing member 76 is made of, for example, an elastic material such as a rubber material or an elastomer. The through hole, which extends in the forward direction 57 and backward direction 58 at the center of the sealing member 76, forms a cylindrical internal surface, forming the ink supply opening 71. The inner diameter of the ink supply opening 71 is slightly smaller than the outer diameter of the ink needle 102. Due to the cap 79 fitted to the outside of the cylindrical wall 73, the sealing member 76 is in contact with the end of the cylindrical wall 73 in a liquid-tight manner.

When the ink cartridge 30 is inserted into the cartridge attaching unit 110 in a state in which the valve body 77 closes the ink supply opening 71, the ink needle 102 enters the ink supply opening 71. The outer circumferential surface of the ink needle 102 comes into contact with the inner circumferential surface, which defines the ink supply opening 71, in a liquid-tight manner while the ink needle 102 elastically deforms the sealing member 76. When the end of the ink needle 102 passes through the sealing member 76 and enters the internal space of the cylindrical wall 73, the end comes into contact with the valve body 77. When the ink cartridge 30 is further inserted into the cartridge attaching unit 110, the ink needle 102 causes the valve body 77 to move in the backward direction 58 against the biased force of the coiled spring 78. This enables ink retained in the retaining chamber 36 to flow to the end of the ink needle 102 through the internal space of the cylindrical wall 73. Although not illustrated in each drawing, ink flows from the internal space of the cylindrical wall 73 through a through hole formed in the end of the ink needle 102 to the internal space of the ink needle 102. Thus, ink retained in the retaining chamber 36 can flow out to the outside through the internal space of the cylindrical wall 73 and the ink needle 102.

The valve body 77, which closes the ink supply opening 71, is not necessarily provided in the ink supply portion 34 in all embodiments. For example, the ink supply opening 71 may be blocked with a film or the like, in which case when the ink cartridge 30 is inserted into the cartridge attaching unit 110, the ink needle 102 breaks the film and the end of the ink needle 102 thereby enters the internal space of the cylindrical wall 73 through the ink supply opening 71. Alternatively, the ink supply opening 71 may be closed due to the elasticity of the sealing member 76, in which case only when the ink needle 102 is inserted, the ink supply opening 71 is expanded by being pressed by the ink needle 102.

Liquid Level Detection Mechanism 60

As illustrated in FIG. 6, the ink cartridge 30 has a liquid level detection mechanism 60 (an example of a liquid detection mechanism). The liquid level detection mechanism 60 has a light access portion 62 and a sensor arm 59. The internal frame 35 has the light access portion 62, which extends above the upper surface in the upward direction 54. The light access portion 62 is a protrusion that defines its internal space continued to the retaining chamber 36. The light access portion 62 is translucent, enabling light to pass through the light access portion 62 in the right direction 55 and left direction 56. In other words, the light access portion 62 is configured to be accessed with light traveling from the light emitting portion in the sensor 103 of the printer 10 toward the photosensitive portion. Specifically, the light access portion 62 has side surfaces 66 and 67 (examples of a first side surface and a second side surface) expanding in the downward direction 53 and upward direction 54 and in the forward direction 57 and backward direction 58. Light that propagates in a direction in which the side surfaces 66 and 67 are separated, that is, in the right direction 55 and left direction 56, passes through the light access portion 62. A distance of the side surface 66 and 67 is smaller than a dimension of the side surface 66 and 67 in the right direction 55 and left direction 56. A dimension of the side surface 66 and 67 in the upward direction 54 is smaller than the distance of the side surface 66 and 67 in the right direction 55 and left direction 56. The light access portion 62 is exposed to the outside through the hole 98 in the front cover 32. The side surfaces 66 and 67 extend above the upper surface 141 in the upward direction 54 through the hole 98 in the front cover 32. Therefore, the side surfaces 66 and 67 cross the upper surface 141.

As illustrated in FIG. 6, a sensor arm 59 (an example of a light attenuating portion) is provided in the retaining chamber 36 in the internal frame 35. The sensor arm 59 is supported by a rotation axis 61 extending in the right direction 55 and left direction 56 and is rotatable around the rotation axis 61.

The sensor arm 59 has a float 63. The float 63 has a smaller specific gravity than ink retained in the retaining chamber 36. In the retaining chamber 36, therefore, the float 63 generates a buoyant force while the float 63 is in the ink. In a state in which the retaining chamber 36 is substantially fully filled with ink, the sensor arm 59 rotates in the counterclockwise direction in FIG. 6 due to the buoyant force of the float 63. Part 68 of the sensor arm 59 (an example of a light attenuator) has entered the interior of the light access portion 62. When the part 68 of the sensor arm 59 comes into contact with a wall that defines the end of the light access portion 62 in the forward direction 57, the orientation of the sensor arm 59 is maintained. While in this state (an example of a first state), the ink detection portion 60 change a state of the light passing from the emitter to the photosensitive portion. For more detail, the part 68 of the sensor arm 59 cuts off light that is emitted from the sensor 103 and would otherwise propagate through the light access portion 62 in the right direction 55 or left direction 56, and performs other processing on the light.

Specifically, when light emitted from the light emitting portion in the sensor 103 reaches one of the right surface and left surface of the light access portion 62, the part 68 of the sensor arm 59 reduces the intensity of light, which is intended to exit from the other of the right surface and left surface of the light access portion 62 and reach the photosensitive portion, blow the predetermined intensity (at which the light is transmitted), for example, to zero. The part 68 of the sensor arm 59 may completely cut off the light so that it does not propagate in the right direction 55 or left direction 56, may partially absorb the light, may attenuate the light, may bend a direction in which the light propagates, or may totally reflects the light for changing the state of the light passing from the emitter to the photosensitive portion.

When ink in the retaining chamber 36 is reduced and the liquid level of the ink drops below the position of the float 63 with the part 68 of the sensor arm 59 being in the orientation in which the part 68 cuts off light that would otherwise propagate through the light access portion 62 and performs other processing on the light, the float 63 drops together with the liquid level. Accordingly, the sensor arm 59 rotates in the counterclockwise direction in FIG. 6. Due to this clockwise direction, the part 68 of the sensor arm 59, the part 68 having entered the interior of the light access portion 62, moves through the internal space in the light access portion 62 substantially in the backward direction 58 and reaches the end of the internal space in the light access portion 62 in the backward direction 58, deviating the part 68 from a light path that extends from the light emitting portion in the sensor 103 to its light receiving section. In this state (an example of a second state), light intended to propagate from one of the right surface and left surface of the light access portion 62 to the other can pass through the internal space of the light access portion 62 in this embodiment, and the intensity of light that will reach the photosensitive portion in the sensor 103 is equal to or higher than the predetermined intensity (at which the light is transmitted).

Intervening Wall 80

As illustrated in FIGS. 3A and 4A, the ink cartridge 30 includes an insertion detection mechanism having an intervening wall 80 (an example of a second light attenuating portion as well as a light attenuating wall) that is provided on the upper surface 141 of the front cover 32; the intervening wall 80 is displaced from the IC board 64 in the backward direction 58 and displaced from the hole 98 in the forward direction 57 such that the intervening wall 80 is disposed between the IC board 64 and the light access portion 62. The intervening wall 80 protrudes from the upper surface 141 in the upward direction 54. The intervening wall 80 has a front surface 81 and a rear surface 82, which expand in the right direction 55 and left direction 56, side surfaces 83 and 84, which expand in the forward direction 57 and backward direction 58, and an upper surface 88. A dimension D1 (see FIG. 5) of the side surfaces 83 and 84 in the forward direction 57 and backward direction 58 is larger than a dimension D2 (see FIG. 15A) of the front surface 81 and rear surface 82 in the right direction 55 and left direction 56. That is, the intervening wall 80 has a thin-plate shape in which the dimension in the forward direction 57 and backward direction 58 is larger than the dimension in the right direction 55 and left direction 56. In this embodiment, with the ink cartridge 30 attached to the cartridge attaching unit 110, light emitted from the light emitting portion in the sensor reaches one of the side surface 83 and 84 of the intervening wall 80, the side surface 83 and 84 reduces the intensity of light, which is intended to exit from the other of the side surface and of the intervening wall 80 and reach the photosensitive portion, blow the predetermined intensity (at which the light is transmitted), for example, to zero. That is, the insertion of the ink cartridge 30 into the cartridge attaching unit is detected by intervening wall 80 which is configured to cut off or attenuate the light from emitter toward the photosensitive portion.

Placement of the light access portion 62, IC board 64, intervening wall 80, locking surface 151, and the like in the ink cartridge 30

As illustrated in FIGS. 3A and 3B to FIG. 6 and FIG. 15A, the IC board 64 is displaced from the light access portion 62 in the insertion direction 51 (forward direction 57). On the upper surface 141 of the front cover 32, the IC board 64 is disposed closer to the side surface 143 positioned in the right direction 55 than to the side surface 144 positioned in the left direction 56. The center of the IC board 64 is disposed closer to the side surface 66 of the light access portion 62 than to its side surface 67 in the left direction 56. The light emitting portion in the sensor 103 faces the side surface 67, and the photosensitive portion in the sensor 103 faces the side surface 66. When viewed in the downward direction 53 and upward direction 54, the IC board 64 is disposed at the same position as the ink supply portion 34. In other words, at least a part of the IC board 64 is overlapped with the ink supply portion 34 in the downward direction 53 and upward direction 54.

The intervening wall 80 is disposed above the IC board 64 in the upward direction 54. In the backward direction 58, the intervening wall 80 is disposed closer to the light access portion 62 than the IC board 64 than is. The intervening wall 80 extends upwardly beyond the upper end of the sensor arm 59, which is in contact with the wall that defines the end of the light access portion 62 in the forward direction 57.

The dimension of the rear surface 82 of the intervening wall 80 in the right direction and the left direction is longer than a distance between the side surface 66 and the side surface 67 of the light access portion 62.

Figure 15A:
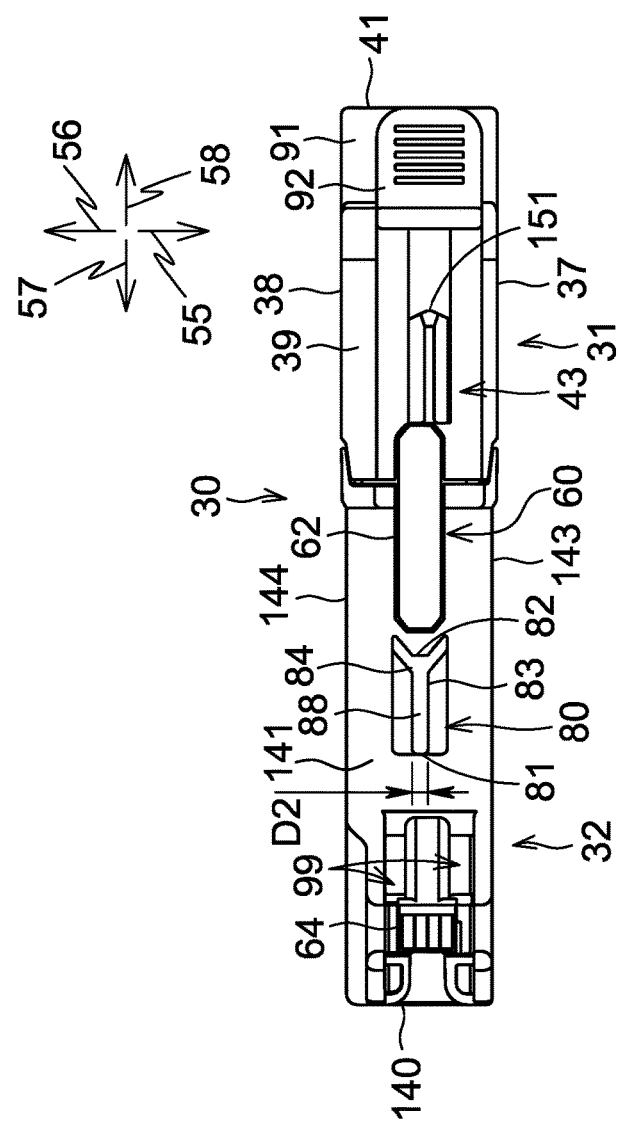
FIG. 15A is a plan view of the ink cartridge when viewed downwardly.

The light access portion 62 is displaced from the IC board 64 in the removal direction 52 (displaced from the IC board 64 in the backward direction 58). The light access portion 62 is disposed above the IC board 64 in the downward direction 53 and upward direction 54. In other words, the internal space of the light access portion 62 is dispose above the electrode 65 of the IC board 64. For more details, with the ink cartridge 30 attached to the cartridge attaching unit 110, an area of the light access portion 62 which the light from the light emitting portion pass through the light access portion 62 in the right direction 55 and left direction 56 is positioned above the electrode 65 of the IC board. The locking surface 151 is displaced from the light access portion 62 in the removal direction 52 (displaced from the light access portion 62 in the backward direction 58). In the upward direction 54, the light access portion 62 is disposed closer to the locking surface 151 than the IC board 64 is. The upper end of the light access portion 62 in the upward direction 54 is closer to the locking surface 151 than the IC board 64 is. With the ink cartridge 30 in the attached orientation, the locking surface 151 is disposed above the light access portion 62 in the upward direction 54. With the ink cartridge 30 in the attached orientation, the light access portion 62 is disposed above the IC board 64 in the upward direction 54. That is, in the upward direction 54, the upper end of the locking surface 151, the upper end of the light access portion 62, and the upper surface of the IC board 64 are disposed at higher positions in this order. The IC board 64, light access portion 62, and locking surface 151 are aligned in the insertion direction 51. In other words, as illustrated in FIG. 15A, the IC board 64, light access portion 62, and locking surface 151 are disposed so that at least part of each of them overlaps in the insertion direction 51 when the ink cartridge 30 is viewed in the downward direction 53.

The dimension of the locking surface 151 in this embodiment in the downward direction 53 and upward direction 54 is smaller than the dimension of the light access portion 62 in the downward direction 53 and upward direction 54. Since, however, the upper surface 39 of the rear cover 31 is positioned above the upper surface 141 of the front cover 32, the upper end of the locking surface 151 is positioned above the upper surface of the light access portion 62. If, therefore, the upper surface 39 of the rear cover 31 and the upper surface 141 of the front cover 32 are disposed at the same position in the downward direction 53 and upward direction 54, when the dimension of the locking surface 151 in the downward direction 53 and upward direction 54 is made to be larger than the dimension of the light access portion 62 in the downward direction 53 and upward direction 54, the upper end of the locking surface 151 is positioned above the upper end of the light access portion 62.

The lower surface 89 is positioned above the ink supply portion 34 in the upward direction 54 and below the IC board 64 in the downward direction 53.

Operation in which the ink cartridge 30 is attached to the cartridge attaching unit 110

A process of the attachment of the ink cartridge 30 to the cartridge attaching unit 110 will be described below.

As illustrated in FIG. 7, in the ink cartridge 30 in which the cartridge attaching unit 110 has yet to be attached to the cartridge attaching unit 110, the valve body 77 closes the ink supply opening 71 in the sealing member 76. This blocks a flow of ink from the retaining chamber 36 to the outside of the ink cartridge 30.

As illustrated in FIG. 7, the ink cartridge 30 is inserted into the case 101 through the opening 112 in the cartridge attaching unit 110. The upper portion 41U of the rear surface 41 of the rear cover 31 is positioned from the lower portion 41L in the removal direction 52, that is, closer to the user, so the user inserts the ink cartridge 30 into the cartridge attaching unit 110 in the insertion direction 51 while pressing the upper portion 41U. The user is prompted to push the upper portion 41U because a sheet pasted to the upper portion 41U indicates PUSH or another character string, a symbol such as an arrow, or a figure indicating a push with a finger, or the like, as described above. Lower portions of the ink cartridge 30, that is, lower portions of the front cover 32 and rear cover 31, enter the lower guide groove 109 in the case 101. The second protrusion 86 is disposed at a lower portion of the front cover 32. When part of the recess 87 protruding from the lower surface 142 of the front cover 32 in the downward direction 53 comes into contact with the lower surface of the guide groove 109, the front of the front cover 32 is lifted and the lower surface 142 is inclined with respect to the insertion direction 51. That is, on the lower surface of the guide groove 109, part of the of the recess 87 in the front cover 32 and part of the lower surface 142 in the vicinity of the lower end are mutually brought into contact.

When the ink cartridge 30 is further inserted into the cartridge attaching unit 110 in the insertion direction 51 as illustrated in FIG. 8, the recess 87 in the second protrusion 86 in the front cover 32 comes into contact with the slider 107. At this time, the user is pushing the upper portion 41U of the rear surface 41 of the rear cover 31 of the ink cartridge 30. This causes the ink cartridge 30 to rotate in the counterclockwise direction in FIG. 8, centered around a contact between the slider 107 and the recess 87 in the second protrusion 86. Due to this rotation, the lower surface 142 of the front cover 32 moves apart from the lower surface of the lower guide groove 109, and an upper portion of the ink cartridge 30 comes into contact with the upper guide groove 109.

Figure 9:
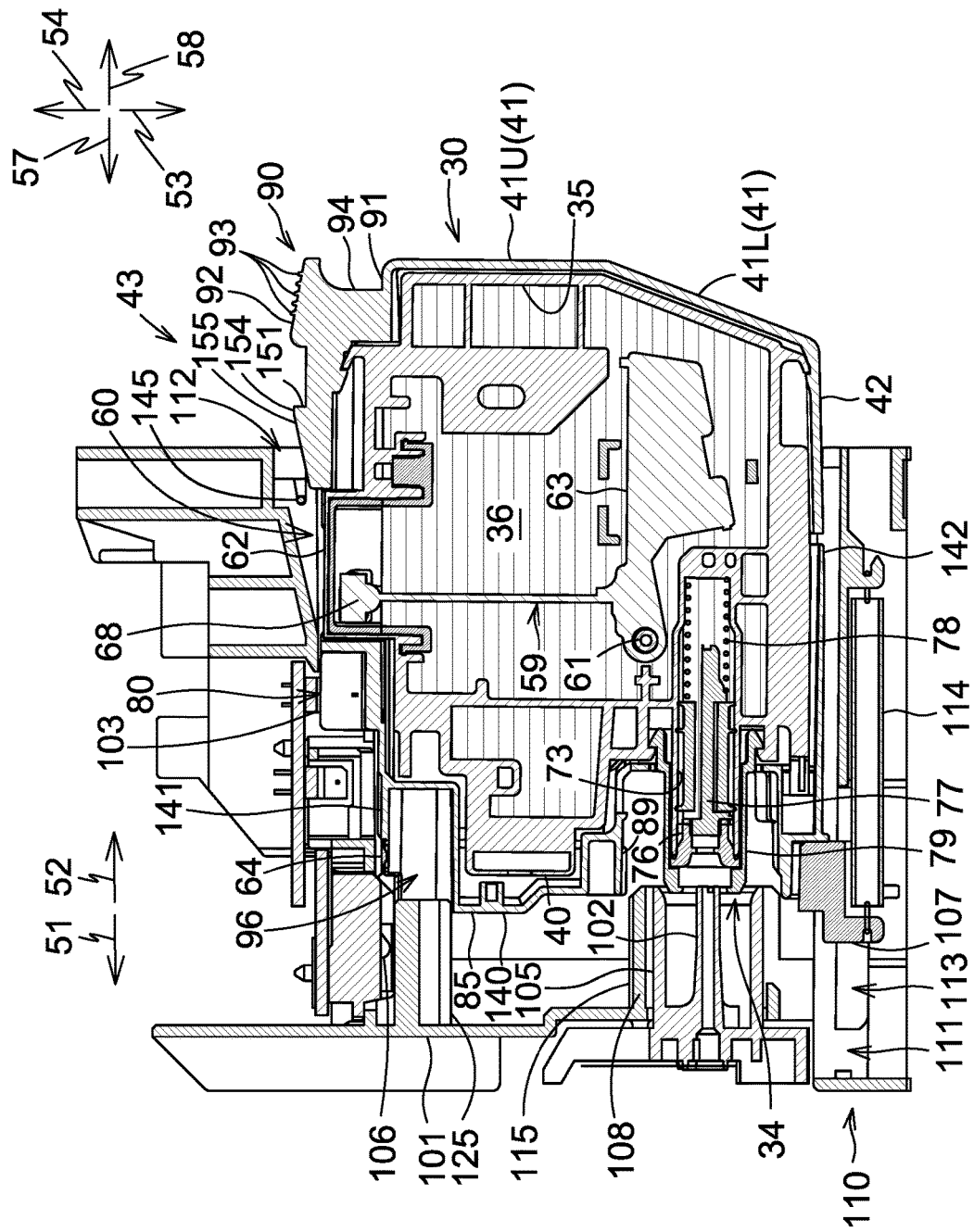
FIG. 9 is a longitudinal cross-sectional view of the ink cartridge and cartridge attaching unit, indicating a state in which an ink supply unit starts to enter a guide and a rod starts to enter a recess in a front cover.

As illustrated in FIG. 9, when the ink cartridge 30 is further inserted in the insertion direction 51 against the biased force of the extension spring 114 with which the slider 107 is biased in the removal direction 52, the cap 79 in the ink supply portion 34 starts to enter the guide 105. The recess 96 in the front cover 32 faces the rod 125, and the rod 125 starts to enter the recess 96. The upper surface 115 of the positioning member 108 in the cartridge attaching unit 110 starts to enter a space between the first protrusion 85 on the ink cartridge 30 and the ink supply portion 34.

As illustrated in FIG. 10, when the ink cartridge 30 is further inserted in the insertion direction 51 against the biased force of the extension spring 114 with which the slider 107 is biased in the removal direction 52, the cap 79 in the ink supply portion 34 enters the guide 105 and the ink needle 102 enters the ink supply opening 71, causing the valve body 77 to move apart from the sealing member 76 against the biased force of the coiled spring 78. In addition to the biased force of the extension spring 114, which is applied through the slider 107, the biased force of the coiled spring 78 is applied to the ink cartridge 30 in the removal direction 52.

The upper surface 115 of the positioning member 108 in the cartridge attaching unit 110 comes into contact with the lower surface 89 of the first protrusion 85 on the front cover 32 and supports the front cover 32 from below. When the IC board 64 reaches a portion below the contacts 106, the contacts 106 are elastically deformed upwardly and the electrodes 65 are thereby electrically connected to their corresponding contacts 106. At this time, although the IC board 64 is biased in the downward direction 53 by the elastic deformation of the contacts 106, the upper surface 115 of the positioning member 108 supports the front cover 32 from below, so the IC board 64 is accurately positioned to the contacts 106 in the downward direction 53 and upward direction 54. In the process of the completion of the attachment of the ink cartridge 30 to the cartridge attaching unit 110, when the ink cartridge 30 is inserted in the insertion direction 51 with the contacts 106 electrically connected to their corresponding electrodes 65, the contacts 106 slide on their corresponding electrodes 65. Due to the sliding of the contacts 106 on their corresponding electrodes 65, shavings may be generated from the electrodes 65.

The protrusion 43 on the rear cover 31 reaches the locking portion 145 and the inclined surface 155 slides on the locking portion 145. When the user presses the upper portion 41U of the rear surface 41 in the insertion direction 51, moment of rotation is exerted on the ink cartridge 30 in the counterclockwise direction in FIG. 10. Due to a contact between the inclined surface 155 and the locking portion 145, however, the ink cartridge 30 rotates in the clockwise direction in FIG. 10 against the moment of rotation, centered around the center of the ink supply opening 71, in the sealing member 76, in which the ink needle 102 has been inserted, in other words, the center of a portion, of ink needle 102, with which the inner circumferential surface of the sealing member 76 is in contact, the surface defining the ink supply opening 71. The orientation of the ink cartridge 30 illustrated in FIG. 10 is referred to as a second orientation.

While the ink cartridge 30 is in the second orientation, the locking surface 151 of the protrusion 43 is positioned below the locking portion 145. While the ink cartridge 30 is in the second orientation, the center of the rotation described above and the IC board 64 are at the same position in the insertion direction 51. Therefore, the biased force applied to the IC board 64 by the contacts 106 does not work as moment with which the ink cartridge 30 is rotated or is only extremely small moment. While the ink cartridge 30 is in the second orientation, the lower surface 42 of the front cover 32 is in contact with or near the lower surface of the lower guide groove 109, so, in this embodiment, the lower surface 42 of the front cover 32 is horizontal. While the ink cartridge 30 is in the second orientation, the lower portion 41L of the rear surface 41 of the rear cover 31 extends from the upper portion 41U in the insertion direction 51.

Figure 11:
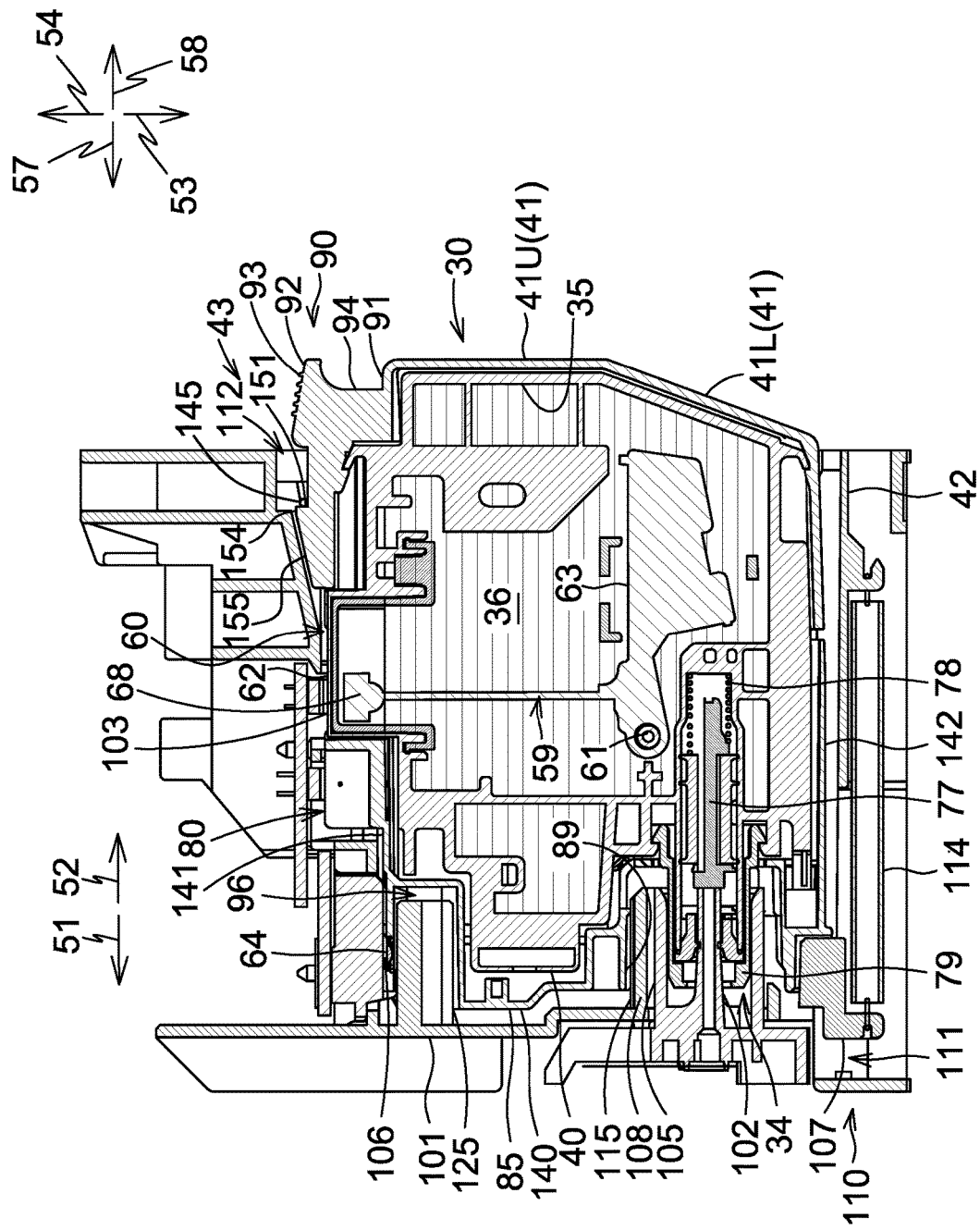
FIG. 11 is a longitudinal cross-sectional view of the ink cartridge and cartridge attaching unit, indicating a state in which the ink cartridge is positioned in the cartridge attaching unit.

As illustrated in FIG. 11, when the ink cartridge 30 is further inserted in the insertion direction 51 against the biased force of the extension spring 114 and the biased force of the coiled spring 78 with which the slider 107 is biased in the removal direction 52, the inclined surface 155 and horizontal surface 154 of the protrusion 43 on the rear cover 31 are positioned closer to the rear surface of the case 101 than the locking portion 145 is. Since moment of rotation has been applied to the ink cartridge 30 in the counterclockwise direction in FIG. 11 as a result of the upper portion 41U of the rear surface 41 being pressed in the insertion direction 51 by the user, the inclined surface 155 and horizontal surface 154 are separated from the locking portion 145. Therefore, the ink cartridge 30 rotates in the counterclockwise direction in FIG. 11, centered around the center of the ink supply opening 71, in the sealing member 76, in which the ink needle 102 has been inserted. The orientation of the ink cartridge 30 illustrated in FIG. 11 is referred to as the first orientation.

While the ink cartridge 30 is in the first orientation, the locking surface 151 faces the locking portion 145 in the removal direction 52. When the ink cartridge 30 rotates from the second orientation to the first orientation, the rear cover 31 comes into contact with the locking portion 145. Due to a shock generated in this contact, the user recognizes that the pressing of the ink cartridge 30 in the insertion direction 51 has been completed. If the user cancels the pressing of the ink cartridge 30 in the insertion direction 51, the ink cartridge 30 moves in the removal direction 52 due to the biased force of the coiled spring 78 and the biased force of the extension spring 114 exerted through the slider 107. With the ink cartridge 30 placed in the first orientation, the locking surface 151 faces the locking portion 145 in the removal direction 52, so when the ink cartridge 30 is slightly moved in the removal direction 52, the locking surface 151 comes into contact with the locking portion 145. Therefore, the ink cartridge 30 remains in the first orientation, restricting movement in the removal direction 52. That is, the ink cartridge 30 is in a state in which the ink cartridge 30 has been positioned in the cartridge attaching unit 110 and has been completely attached to it.

In this embodiment, the IC board 64 is disposed on the upper surface 141 of the front cover 32, that is, above ink supply opening 71. Even if, therefore, ink in the retaining chamber 36 flows out of the ink supply opening 71 when the ink cartridge 30 is inserted into the cartridge attaching unit 110 or is removed from it, the ink that has flowed out is hard to adhere to the IC board 64. With the ink cartridge 30 attached to the cartridge attaching unit 110, the retaining chamber 36 in the ink cartridge 30 is preferably open to the atmosphere. As an example of a structure to make the retaining chamber 36 open to the atmosphere, an air path formed in the ink cartridge 30 may communicate with the outside, that is, may be made to be open to the outside, as the ink supply valve 70 moves after the ink needle 102 has been inserted into the ink supply opening 71. Alternatively, an air path formed in the ink cartridge 30 may be sealed with, for example, a tape against the atmosphere. Then, the user may remove the tape to make the retaining chamber 36 open to the atmosphere through the air path before attaching the ink cartridge 30 to the cartridge attaching unit 110.

Operation in which the ink cartridge 30 rotates from the second orientation to the first orientation in the cartridge attaching unit 110 will be described below in more detail.

Figure 12:
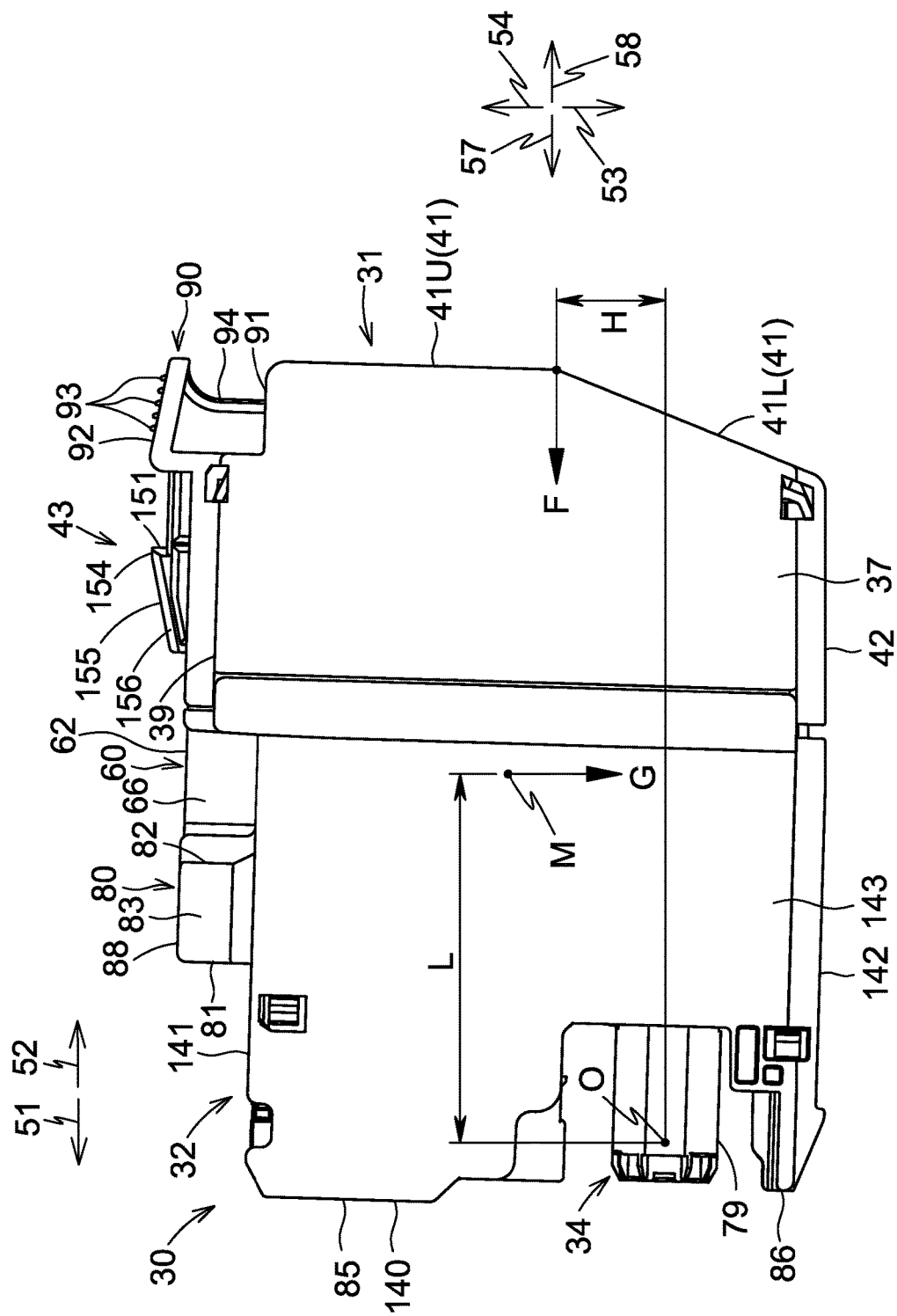
FIG. 12 is a side view of the ink cartridge when it is in a second orientation, illustrating a relationship of a force when the user presses an upper portion of a rear surface.

As illustrated in FIG. 12, the force of gravity applied to the ink cartridge 30 will be denoted G; the biased force of the extension spring 114 and the biased force of the coiled spring 78 with which the ink cartridge 30 placed in the first orientation is biased in the removal direction 52 will be denoted F; a distance in the insertion direction 51 between the center M of gravity of the ink cartridge 30 placed in the second orientation and the center O of rotation will be denoted L; a distance, along the upward direction 54 orthogonal to the insertion direction 51, from the lower end of the upper portion 41U of the rear surface 41 of the rear cover 31 of the ink cartridge 30 placed in the second orientation to a plane extending from the center O of rotation will be defined as a height H. Then, the following equation holds.

(Biased force $F$)×(height $H$)>(force $G$ of gravity)× (distance $L$)

In the above equation, the product of the force G of gravity and the distance L is equivalent to the size of moment with which the ink cartridge 30 is rotated in the clockwise direction in FIG. 12.

When the user inserts the ink cartridge 30 into the cartridge attaching unit 110 in the insertion direction 51, the user needs to press the ink cartridge 30 in the insertion direction 51 with a force larger than at least the biased force F. That is, if a force with which the user presses the ink cartridge 30 in the insertion direction 51 is denoted U, the force U needs to be larger than the biased force F. When the user holds the ink cartridge 30 at a certain position in the insertion direction 51 against the biased force F, the biased force F is equal to the force U. Therefore, when the user inserts the ink cartridge 30 into the cartridge attaching unit 110, the force U equivalent to at least the biased force F is exerted on the ink cartridge 30 in the insertion direction 51. The user presses the upper portion 41U of the rear surface 41 of the rear cover 31 of the ink cartridge 30, that is, a portion of the upper portion 41U above its lower end. It will be assumed here that the upper portion 41U of the rear surface 41 with the ink cartridge 30 placed in the second orientation is substantially orthogonal to the insertion direction 51. Then, moment equivalent to at least the product of the biased force F and the height H is exerted on the ink cartridge 30 in the counterclockwise direction in FIG. 12. Since the above equation holds, there is moment in the ink cartridge 30 in the counterclockwise direction in FIG. 12 in the process of the insertion of the ink cartridge 30 into the cartridge attaching unit 110 in the insertion direction 51.

Since the ink cartridge 30 is receiving the biased force of the extension spring 114 through the slider 107 at the second protrusion 86, that is, is receiving the biased force of the extension spring 114 at a position below the center O of rotation, the biased force of the extension spring 114 also works as moment with which the ink cartridge 30 is rotated counterclockwise. Even if there is no biased force of the extension spring 114, it will be appreciated that counterclockwise moment is exerted on the ink cartridge 30 when the ink cartridge 30 is inserted into the cartridge attaching unit 110.

Therefore, as described above, when the inclined surface 155 of the protrusion 43 has slid on the locking portion 145 and the inclined surface 155 and horizontal surface 154 move apart from the locking portion 145 in the insertion direction 51, the ink cartridge 30 changes from the second orientation to the first orientation due to moment in the counterclockwise direction in FIG. 12.

Figure 14:
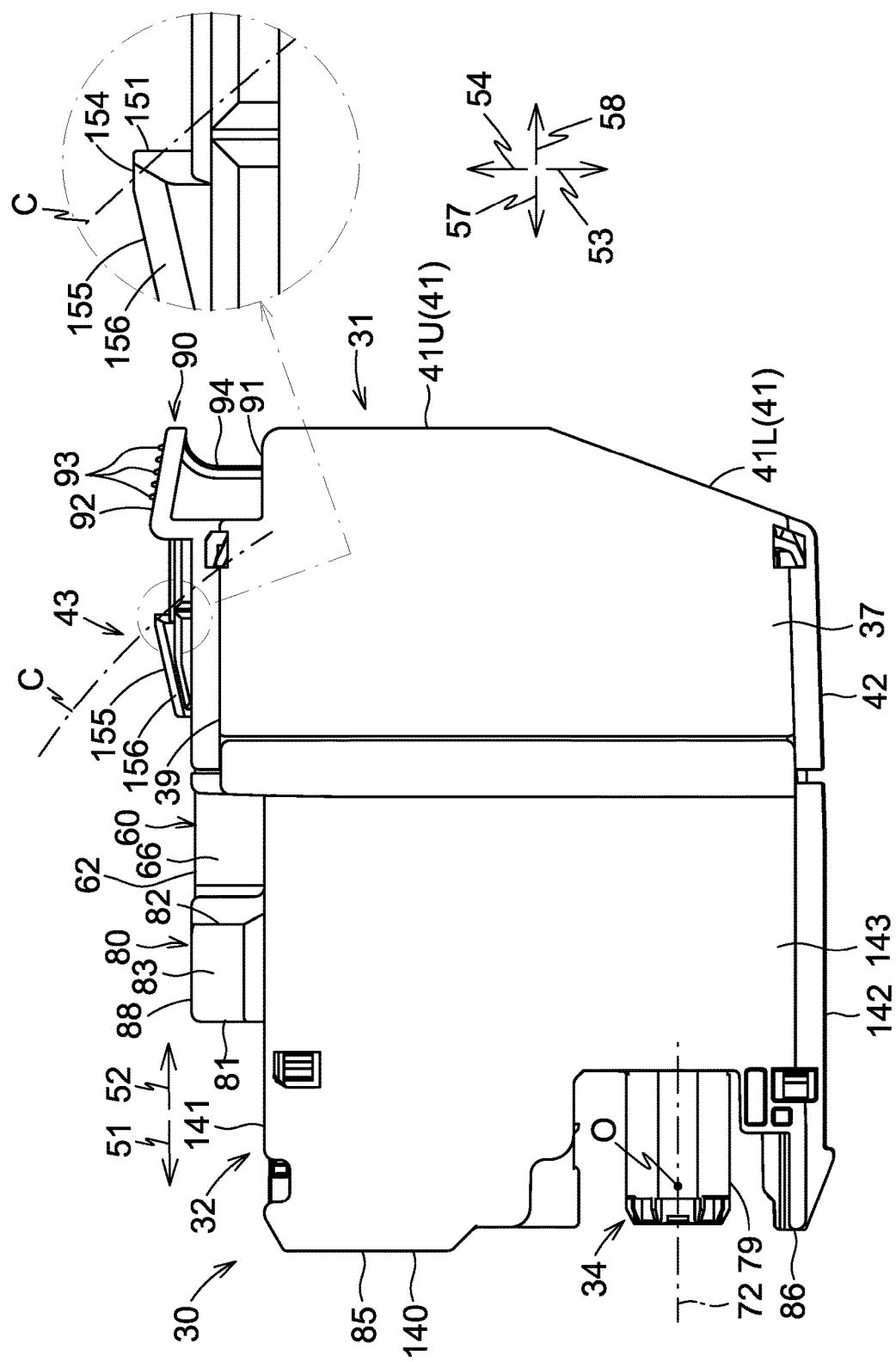
FIG. 14 is a side view of the ink cartridge when it is in a first orientation, illustrating a relationship between a virtual arc and a locking surface.

As illustrated in FIG. 14, when the ink cartridge 30 is in the first orientation, the upper end of the locking surface 151 is positioned outwardly beyond a virtual arc C, the center of which is the center O of rotation, the virtual arc C passing the locking portion 145. The lower end of the locking surface 151 is positioned inside the virtual arc C. With the ink cartridge 30 placed in the first orientation, the lower end of the locking surface 151 is more inward in the virtual arc C, that is, closer to the center O of rotation, than the upper end of the locking surface 151 is. Therefore, due to the biased force exerted in the removal direction 52, the locking portion 145 slides toward the lower end of the locking surface 151. As a result, in a state in which the locking portion 145 and locking surface 151 are in contact with each other, the ink cartridge 30 is rotated so as to be placed in the first orientation.

Figure 13:
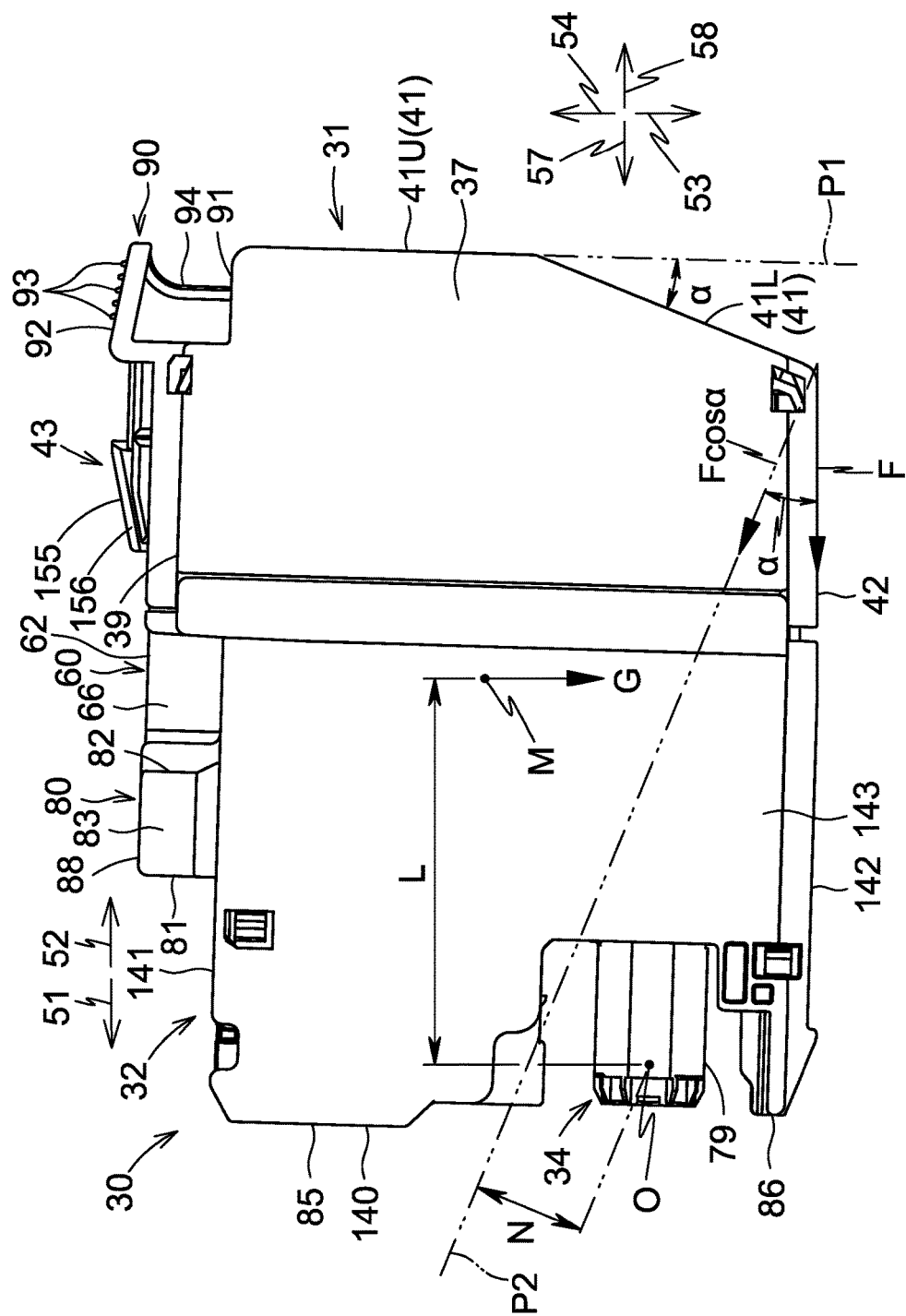
FIG. 13 is a side view of the ink cartridge when it is in the second orientation, illustrating a relationship of a force when the user presses a lower portion of the rear surface.

It will be assumed that the user has pushed the lower portion 41L of the rear surface 41 of the rear cover 31 instead of pushing the upper portion 41U in the process of the insertion of the ink cartridge 30 into the cartridge attaching unit 110. As illustrated in FIG. 13, the lower portion 41L of the ink cartridge 30 placed in the second orientation crosses a first virtual plane P1 orthogonal to the insertion direction 51 (orthogonal to the drawing sheet of FIG. 13) at an angle of $\alpha$. The length of a normal extending from the center O of rotation toward a second virtual plane P2 orthogonal to the lower portion 41L (orthogonal to the drawing sheet of FIG. 13) at the lower end of the lower portion 41L will be denoted N. Then, the following equation holds.

(Biased force $F$)×cos $\alpha$×(length $N$)>(force $G$ of gravity)×(distance $L$)

In the above equation, the product of the force G of gravity and the distance L is equivalent to the size of moment with which the ink cartridge 30 is rotated in the clockwise direction in FIG. 12, as in the equation described above.

When the user inserts the ink cartridge 30 into the cartridge attaching unit 110, if the user presses the lower portion 41L of the ink cartridge 30 in the insertion direction 51 with the force U equivalent to at least the biased force F, moment with a strength equivalent to at least the product of the cos $\alpha$ component of the biased force F and the length N is exerted on the ink cartridge 30 in the counterclockwise direction in FIG. 13. Since the above equation holds, even if the user presses the lower portion 41L of the ink cartridge 30 in the insertion direction 51, moment is exerted on the ink cartridge 30 in the counterclockwise direction in FIG. 13.

When removing the ink cartridge 30 from the cartridge attaching unit 110, the user presses the manipulation surface 92 downwardly. With the ink cartridge 30 placed in the first orientation, as illustrated in FIG. 15, the manipulation surface 92 is visible when the ink cartridge 30 is viewed in the downward direction 53, and also visible when the ink cartridge 30 is viewed in the forward direction 57 (insertion direction 51). With the ink cartridge 30 placed in the first orientation, the manipulation surface 92 faces in the upward direction 54 and in the removal direction 52. Therefore, when the user manipulates the manipulation surface 92 to remove the ink cartridge 30 positioned in the cartridge attaching unit 110, a force is exerted on the ink cartridge 30 in the downward direction 53 and in the insertion direction 51. Due to a force exerted in the insertion direction 51, the locking surface 151 is separated from the locking portion 145. Due to a force exerted in the downward direction 53, the ink cartridge 30 is rotated from the first orientation to the second orientation. A force that the user applies to the manipulation surface 92 to rotate the ink cartridge 30 from the first orientation to the second orientation is reduced when compared with a case in which the ink cartridge 30 is rotated from the first orientation to the second orientation while the locking surface 151 causes a slide with the locking portion 145.

When the ink cartridge 30 is rotated from the first orientation to the second orientation, the locking surface 151 is positioned below the locking portion 145. Then, the ink cartridge 30 is moved in the cartridge attaching unit 110 in the removal direction 52 by the biased force of the extension spring 114 and coiled spring 78. In the process of the removal of the ink cartridge 30 from the cartridge attaching unit 110, when the ink cartridge 30 is moved in the removal direction 52 while the contacts 106 remain electrically connected to their corresponding electrodes 65, the contacts 106 slide on their corresponding electrodes 65. Due to the sliding of the contacts 106 on their corresponding electrodes 65, shavings may be generated from the electrodes 65.

When the ink cartridge 30 is separated from the slider 107, the biased force that has been exerted on the ink cartridge 30 in the removal direction 52 is eliminated, so an inertial force exerted on the ink cartridge 30 disappears and the movement of the ink cartridge 30 in the removal direction 52 is terminated. At this time, at least the rear cover 31 of the ink cartridge 30 is positioned outwardly beyond the opening 112 in the case 101 of the cartridge attaching unit 110, so the user can hold the rear cover 31 and can take out the ink cartridge 30 from the cartridge attaching unit 110.

Effects in this Embodiment

With the ink cartridge 30 according to this embodiment, the positional precision of the IC board 64, which is disposed at the front end in the insertion direction 51, is high in the cartridge attaching unit 110, so the IC board 64 is reliably connected to the contacts 106. The locking surface 151 disposed at the back end in the insertion direction 51 can easily perform an operation for locking and unlocking, that is, can easily rotate around the center O of rotation. Thus, the functions of the IC board 64, light access portion 62, and locking surface 151 are effectively used and positional precision can be increased.

Since the locking surface 151 disposed at the back end in the insertion direction 51, the range of the rotation of the ink cartridge 30 between the first orientation and the second orientation, that is, the rotation angle can be reduced.

In the upward direction 54, the light access portion 62 is disposed closer to the locking surface 151 than the IC board 64 is. This enables the ink cartridge 30 to be designed so that the distance between the IC board 64 and the light access portion 62 is prolonged. Thus, it is possible to assure a large space used for the movement of the ink supply valve 70 in the ink supply portion 34 and a large space used for the rotation of the sensor arm 59. Particularly, although the sensor arm 59 in the light access portion 62 in the ink cartridge 30 according to this embodiment is disposed so that the sensor arm 59 is moved substantially in the insertion direction 51 and is placed in the first state or second state, since, in the removal direction 52, the light access portion 62 is disposed closer to the locking surface 151 than the IC board 64 is, a large space can be assured for the movement of the sensor arm 59 from the second state to the first state.

Since the upper end of the light access portion 62 is closer to the locking surface 151 than the IC board 64 is, the light access portion 62 can be disposed at a high position as much as possible, enabling the internal space of the retaining chamber 36 to be easily assured.

Since the IC board 64, light access portion 62, and locking surface 151 intersect a virtual plane which is parallel with the insertion direction 51 and the upward direction 54, the ink cartridge 30 can be made compact. Particularly, in this embodiment, the direction in which the sensor arm 59 moves is also in the insertion direction 51, the ink cartridge 30 can be made compact both in the 53 and in the upward direction 54.

When the ink cartridge 30 is in the attachment orientation, the light access portion 62 is disposed above the IC board 64, so shavings generated due to relative sliding between the IC board 64 and the contacts 106 are hard to adhere to the light access portion 62. Therefore, even if shavings are generated from the IC board 64, detection by the light access portion 62 is less affected.

Since the intervening wall 80 is disposed between the IC board 64 and the light access portion 62, the intervening wall 80 restricts a route through which shavings generated from the IC board 64 move to the light access portion 62.

Since the light access portion 62 has the side surfaces 66 and 67, a state of the amount of ink remaining in the retaining chamber 36 can be detected through the side surfaces 66 and 67.

Since the dimension of the side surface 66 in the upward direction 54 is smaller than the dimension of the side surface 66 in the insertion direction 51, and a dimension of the side surface 67 of the light access portion 62 in the upward direction 54 is smaller than a dimension of the side surface 67 of the light access portion 62 in the insertion direction 51, the dimension of the light access portion 62 in the downward direction 53 and upward direction 54 is reduced.

Since the dimension of the rear wall 82 of the intervening wall 80 in the right direction and the left direction is longer than a distance between the first side surface 66 and the second side surface 67 of the light access portion 62, the intervening wall can restrict the route through which shavings generated from the IC board 64 move to the light access portion 62 more.

Since the dimension of the intervening wall 80 in the forward direction 57 and backward direction 58 is larger than its dimension in the right direction 55 and left direction 56, the distance from the IC board 64 to the light access portion 62 is prolonged. This makes it harder for shavings to reach the light access portion 62.

Since, in the removal direction 52, the intervening wall 80 is disposed closer to the light access portion 62 than the IC board 64 is, shavings generated from the IC board 64 can be easily restricted by the intervening wall 80.

Since the liquid level detection mechanism 60 is configured to change a state of the light passing from the first point toward the second point and accessing the light access portion 62 according to an amount of the liquid stored in the ink cartridge 30, the amount of the liquid stored in the ink cartridge 30 can be detected.

Since the light access portion 62 is configured to allow the light traveling from the first point toward the second point to pass therethrough, and liquid level detection mechanism 60 further comprises a sensor arm 59, a part 68 of which is configured to be positioned in the light accessing portion 62, wherein the part 68 of the light attenuating portion 59 is configured to change a state of the light passing through the light access portion 62 depending on whether or not an amount of the liquid stored in the ink cartridge 30 is less than a particular amount, the amount of the liquid stored in the ink cartridge 30 can be detected based on the state of the light through the light access portion 62 with the position of the sensor arm 59.

Since the part 68 of the sensor arm 59 is disposed above the circuit board 64 when the amount of the liquid stored in the cartridge 30 is greater than or equal to the particular amount, it is harder for shavings to reach the height at which the light passes through the light access portion 62 for the detection of the amount of the liquid stored in the cartridge 30.

Since the intervening wall 80 extends upwardly beyond the sensor arm 59, which is in contact with the wall that defines the end of the light access portion 62 in the forward direction 57, the intervening wall 80 is positioned between the IC board 64 and the sensor arm 59. This placement of the intervening wall 80 makes it hard for shavings generated from the IC board 64 to reach a position at which the sensor arm 59 is detected by the sensor 103.

The center of the IC board 64 is disposed closer to the side surface 66 of the light access portion 62 than to the side surface 67. The light emitting portion in the sensor 103 faces the side surface 67, and the photosensitive portion in the sensor 103 faces the side surface 66, as described above. A distance over which shavings generated from the IC board 64 move to the side surface 67 is longer than a distance over which the shavings move to the side surface 66. Light emitted from the light emitting portion in the sensor 103 has been diffused more greatly when the light exits the side surface 66 of the light access portion 62 than when the light enters the side surface 67 of the light access portion 62. Therefore, the possibility of the movement of the shavings to the side surface 67 is lower than the possibility of the movement of the shavings to the side surface 66. On the side surface 66, therefore, even if the shavings have moved to the light access portion 62, a detection result of the sensor 103 is less affected.

When viewed in the downward direction 53 and upward direction 54, the rotation axis 61 of the sensor arm 59 is overlapped with the light access portion 62. Therefore, a portion, of the light access portion 62, that is used for rotation of the sensor arm 59 is reduced in the downward direction 53 and upward direction 54. Therefore, the dimension of the IC board 64 in the downward direction 53 and upward direction 54 is reduced. As a result, the internal space in the light access portion 62 can be saved.

Since, on the upper surface 141 of the front cover 32, the recess 99 is displaced from the IC board 64 in the removal direction 52, shavings generated from the IC board 64 stay in the recess 99. This makes it hard for the shavings to scatter.

When viewed in the downward direction 53 and upward direction 54, the IC board 64 is overlapped with the ink supply portion 34. This enables the ink cartridge 30 to be designed so that a distance between the IC board 64 and the light access portion 62 is prolonged.

The positioning surface 89 is disposed so as to face the downward direction 53 at a position at which, when viewed in the downward direction 53, the positioning surface 89 and IC board 64 overlap. Therefore, the positional precision of the IC board 64 can be increased with respect to the contacts 106.

Since a lower surface 89 of the first protrusion 85 configured to restrict movement of the ink cartridge 30 in the upward direction 54 and a downward direction 53, and the lower surface 89 of the first protrusion 85 is disposed upward with respect to the ink outlet portion 34 in the upward direction 54 and disposed downward with respect to the circuit board 64 in the upward direction 54, IC board 64 is accurately positioned to the contacts 106 in the downward direction 53 and upward direction 54.

The ink cartridge 30 comprise the portion of the sensor arm 59 as the first light attenuating portion and the intervening wall 80 as the second light attenuating portion, and the first light attenuating portion and the second light attenuating portion are disposed above the circuit board 64. This enables the sensor for detecting the insertion of the ink cartridge 30 and the sensor 103 for detecting the state of the liquid in the ink cartridge 30 to be disposed at an upper area of the cartridge attaching unit 110. It enables the both sensors to be disposed on the same electrical circuit board. Having a common electrical circuit board contributes to cost and space reduction compared to a situation in which two electrical circuit boards are provided for the two sensors respectively.

Variation

In the embodiment described above, an aspect has been indicated in which when the sensor arm 59 is rotated in the light access portion 62, the passing state of light in which light passes through the light access portion 62 changes. However, a change in the passing state in which light passes through the light access portion 62 may be achieved by using other than the sensor arm 59. For example, attenuation of light as a change in a state in which light passes through a light access portion 62 may be achieved by using a light attenuating portion that is movable due to a change in the liquid level in a liquid retaining chamber or by using a side surface of the light attenuating portion to completely block light. Alternatively, the light attenuating portion may absorb part of light, may refract the light, or may totally reflect the light to attenuate the light. Another method may be used. The user may visually check the liquid level detection mechanism 60 to grasp the amount of liquid remaining in the liquid retaining chamber.

Figure 16A:
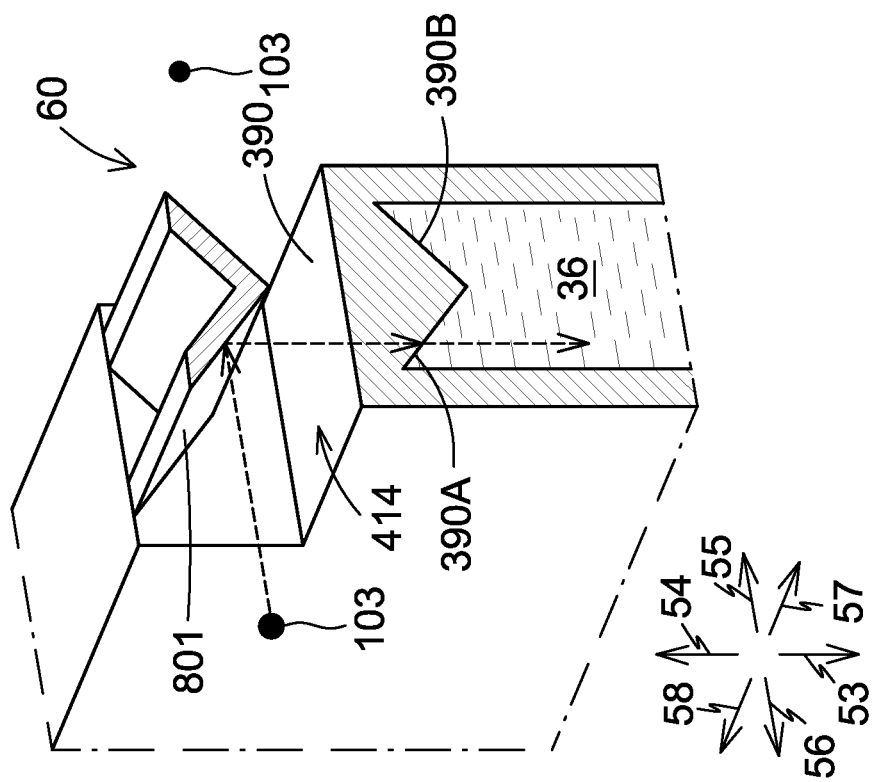
FIG. 16A is a perspective view of a variation of a liquid level detection mechanism, illustrating a state in which ink in a retaining chamber is reduced.
Figure 16B:
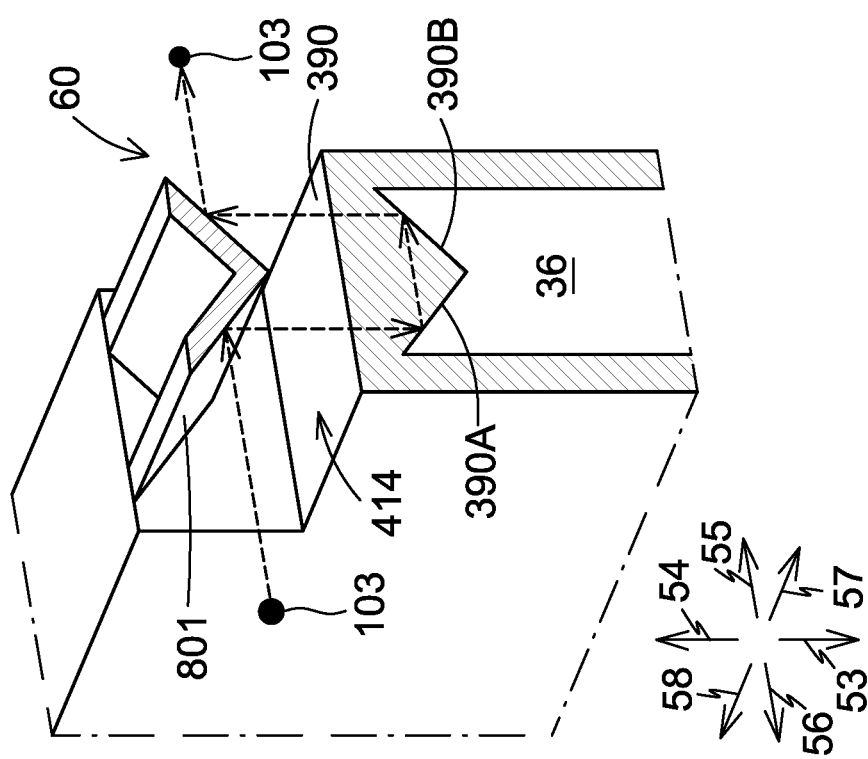
FIG. 16B is a perspective view of the variation of the liquid level detection mechanism, illustrating a state in which the retaining chamber is filled with ink.

For example, the liquid level detection mechanism 60 may include a light guide path as described in Japanese Unexamined Patent Application Publication No. 2005-313447. In this case, the incidence part 67 or emission part 68 in the publication is equivalent to the light access portion. The liquid level detection mechanism 60 may comprise a reflecting member and a prism. That is, the light access portion 62 may include the reflecting member. FIGS. 16A and 16B are a perspective view of the vicinity of a liquid detection portion in an ink cartridge; the cross-section of a portion ahead of a reflecting member 800 is illustrated.

Although not illustrated in FIGS. 16A and 16B, an IC board is provided on the upper surface 414 of the ink cartridge and ahead of the reflecting member 800 and the reflecting member 800 is disposed behind and above the IC board as part of the light access portion. As illustrated in FIG. 16A, The reflecting member 800 has reflecting portions 801 and 802 that are formed with, for example, an aluminum foil and can thereby reflect light. Reflecting portions 801 and 802 of the reflecting member 800 extends above the upper surface 414 of the ink cartridge. The upper surface 414 is made of a member through which light can pass. A prism 390 is formed at the upper end of the retaining chamber 36. The prism 390 is disposed below the circuit board 64. The prism 390 is configured to reflect light according to the amount of the liquid stored in the cartridge 30, and the reflecting member 800 is configured to reflect light traveling from the emitting portion toward the prism (390A) or reflect the light at the prism (390B) toward the photosensitive portion.

In FIG. 16B, the retaining chamber 36 is fully filled with ink. When ink is in contact with the surfaces 390A and 390B of the prism 390, which face the retaining chamber 36, light (indicated by a dashed line in FIG. 16B) emitted from the light emitting portion in the sensor 103 in the right direction 55 is reflected in the downward direction 53 on the reflecting portion 801, passes through the surface 390A of the prism 390, and enters the retaining chamber 36. If ink in the retaining chamber 36 is reduced and is not in contact with the surfaces 390A or 390B of the prism 390, as illustrated in FIG. 16A, the light, which has been emitted from the light emitting portion in the sensor 103 and reflected in the downward direction 53 on the reflecting portion 801, is reflected in the right direction 55 on the surface 390A of the prism 390, propagates in the prism 390, is reflected in the upward direction 54 on the surface 390B, and reaches the reflecting portion 802. The light reflected on the reflecting portion 802 reaches the photosensitive portion in the sensor 103. As described above, the intensity of light received by the sensor 103 varies depending on the amount of ink remaining in the retaining chamber 36, so a decrease in the amount of remaining ink can be detected on the basis of a detection signal from the sensor 103. In this variation as well, since the reflecting portions 801 and 802 are provided above the IC board, it is possible to prevent shavings generated from the IC board from adhering to the reflecting portions 801 and 802.

A light access portion can be defined as follows. Assuming that there are a position A and a position B aligned in the right direction 55 and the left direction 56. When light, e.g., visible light or infrared light traveling in the right direction 55 or the left direction 56 is emitted from the position A, the light reaches the positon B with an intensity of I. When the light access portion is positioned between the position A and the position B and the amount of liquid stored in the chamber 36 is greater than or equal to a predetermined amount, the light emitted from the position A and traveling in the right direction 55 or the left direction 56 reaches one of a right side surface and a left side surface of the light access portion. When this occurs, light coming out of the other of the right side surface and the left side surface of the light access portion reaches the position B with an intensity which is less than a half of I, e.g., with an intensity of zero. On the other hand, when the light access portion is positioned between the position A and the position B and the amount of liquid stored in the chamber 36 is less than the predetermined amount, the light emitted from the position A and traveling in the right direction 55 or the left direction 56 reaches one of the right side surface and the left side surface of the light access portion. When this occurs, light coming out of the other of the right side surface and the left side surface of the light access portion reaches the position B with an intensity which is greater than or equal to a half of I.

For example, the light emitting portion of the sensor 103 is placed at the position A, and the light receiving portion (photosensitive portion) of the sensor 103 is placed at the position B. When the light receiving portion of the sensor 103 is comprised of a phototransistor for instance, the collector current value of the phototransistor is C when the phototransistor receives light with the intensity of I. When the light access portion is positioned between the position A and the position B and the amount of liquid stored in the chamber 36 is greater than or equal to the predetermined amount, the light emitted from the position A and traveling in the right direction 55 or the left direction 56 reaches one of the right side surface and the left side surface of the light access portion. When this occurs, light coming out of the other of the right side surface and the left side surface of the light access portion reaches the position B with the intensity which is less than a half of I, which causes the collector current value of the phototransistor to become less than a half of C, e.g., become zero. On the other hand, when the light access portion is positioned between the position A and the position B and the amount of liquid stored in the chamber 36 is less than the predetermined amount, the light emitted from the position A and traveling in the right direction 55 or the left direction 56 reaches one of the right side surface and the left side surface of the light access portion. When this occurs, light coming out of the other of the right side surface and the left side surface of the light access portion reaches the position B with an intensity which is greater than or equal to a half of I, which causes the collector current value of the phototransistor to become greater than or equal to a half of C. In the embodiment described above, the side surface 66 corresponds to the right side surface of the light access portion, and the side surface 67 corresponds to the left side surface of the light access portion.

The maximum dimension of the light access portion in the right direction 55 and the left direction 56 (in the embodiment described above, the maximum distance between the side surface 66 and the side surface 67 in the right direction 55 and the left direction 56) is less than the maximum dimension of the ink cartridge 30 (in the embodiment described above, the maximum distance between the side surface 143 or 37 and the side surface 144 or 38 in the right direction 55 and the left direction 56). With this configuration, the light emitting portion and the light receiving portion (photosensitive portion) of the sensor 103 can be placed close to each other, and therefore the accuracy of the detection of the amount of liquid becomes higher.

The light access portion intersects the light traveling in the right direction 55 or the left direction 56 while the electrode 65 is accessed in the downward direction 53 which is perpendicular to the right direction 55 and the left direction 56. Therefore, if the electrode 65 is accessed by the contact 106 in the downward direction 53 and the ink cartridge 30 should changes its orientation, the ink cartridge 30 changes its orientation in the downward direction 53 and the upward direction 54, but not in the right direction 55 and the left direction 56. Therefore, when the electrode 65 is accessed, an angle at which the light intersects the light access portion does not change. If the angle at which the light intersects the light access portion changed, such a change would affect the detection of the amount of liquid.

Nevertheless, because the direction in which the light travels is perpendicular to the direction in which the electrode 65 is accessed, the angle at which the light intersects the light access portion does not change, and influence on the detection of the amount of liquid is reduced.

Although the slider 107 and extension spring 114 have been disposed in the cartridge attaching unit 110 in the embodiment described above, this arrangement is optional. For example, the cartridge attaching unit 110 may lack the slider 107 and extension spring 114, and only the coiled spring 78 in the ink supply portion 34 may be used to bias the ink cartridge 30 inserted into the cartridge attaching unit 110 in the removal direction 52.

Although the IC board 64 and locking surface 151 have been disposed on different covers, front cover 32 and rear cover 31, in the embodiment described above, the IC board 64 and locking surface 151 may be disposed on the same cover member.

Although the rear surface 82 of the intervening wall 80 has Y-shaped portion and the Y-shaped rear surface 82 covers a front part of the light access portion 62, in other embodiment, the rear surface 82 of the intervening wall may have I-shaped portion, not Y-shaped portion. In other words, the dimension of the intervening wall 80 in the left direction and the right direction may be smaller than the distance of the side surface 66 and 67 of the light access portion.

Although, in the embodiment described above, the positioning surface 89 has been provided in the ink cartridge 30, the positioning surface 89 may not be necessarily provided. In a structure in which the positioning surface 89 is not provided in the ink cartridge 30, there is the risk that, in a state in which the ink needle 102 of the cartridge attaching unit 110 is inserted into the ink supply opening 71, the ink cartridge 30 may rotate in the downward direction 53 and upward direction 54, centered around a position at which the ink needle 102 and ink supply opening 71 come into contact with each other. Since, in the insertion direction 51, the IC board 64 is disposed closer to the center described above than the light access portion 62 and locking surface 151 are, however, the IC board 64 is least likely to be affected by rotation. Therefore, it is possible to increase the certainty of contacts between the IC board 64 and the contacts 106, that is contact reliability. In a case in which the positioning surface 89 is provided in the ink cartridge 30, the positioning surface 89 may be disposed above or below the ink supply opening 71. In the insertion direction 51, however, the positioning surface 89 is preferably disposed closer to the IC board 64 than the light access portion 62 is. In this case as well, since the IC board 64 is displaced from the light access portion 62 in the insertion direction 51, contact reliability can be increased.

Although, in the embodiment described above, the IC board 64 has been disposed in the front cover 32 and the locking surface 151 has been disposed in the rear cover 31, the IC board 64 and locking surface 151 may be disposed in only one of the front cover 32 and rear cover 31. If the ink cartridge 30 has a single cover member, the IC board 64, locking surface 151, and positioning surface 89 may be disposed in the cover member.

Although ink has been described as an example of a liquid in the embodiment described above, a preprocessing liquid expelled to a recoding sheet during printing before ink is expelled, for example, may be retained in the liquid cartridge. Alternatively, water used to clean the recording head 21 may be retained in the liquid cartridge.

What is claimed is:

1. A liquid cartridge comprising:
a casing having an upper edge and a bottom edge separated in a first direction;
a liquid outlet extending from the casing in a second direction perpendicular to the first direction;
a circuit board provided at the upper edge;
a wall provided at the upper edge, the wall being provided farther from the liquid outlet than the circuit board is from the liquid outlet in the first direction; and
a locking surface provided at the upper edge, the locking surface being provided farther from the liquid outlet than the circuit board is from the liquid outlet in the first direction;
wherein the wall is provided farther from the liquid outlet than the circuit board is from the liquid outlet in the second direction and provided closer to the liquid outlet than the locking surface is to the liquid outlet in the second direction.

2. The liquid cartridge according to claim 1, further comprising a light attenuating wall extending from the upper edge of the casing in the first direction.

3. The liquid cartridge according to claim 2, wherein the wall is disposed farther from the liquid outlet than the light attenuating wall in the second direction.

4. The liquid cartridge according to claim 2, wherein the light attenuating wall extends farther from the liquid outlet than the circuit board in the first direction.

5. The liquid cartridge according to claim 2, wherein the wall is provided closer to the light attenuation wall than to the circuit board in the second direction.

6. The liquid cartridge according to claim 2, further comprising a light attenuator positioned proximate the wall, wherein the light attenuator is configured to change a state of light passing through the wall in response to the amount of the liquid stored in the liquid cartridge.

7. The liquid cartridge according to claim 6, wherein the light attenuator is configured to pivot around an axis perpendicular to the first direction and the second direction.

8. The liquid cartridge according to claim 1, wherein the liquid cartridge is detachably attachable into a cartridge attaching unit of a printer in the second direction perpendicular to a gravitational direction.

9. A liquid cartridge comprising:
a casing having an upper edge and a bottom edge separated in a first direction;
a liquid retaining chamber between the upper edge and the bottom edge;
a liquid outlet in communication with the liquid retaining chamber extending from the casing in a second direction perpendicular to the first direction;
a circuit board provided at the upper edge;
a protrusion extending from the upper edge and defining an internal space in communication with the liquid retaining chamber, the protrusion being provided farther from the liquid outlet than the circuit board is from the liquid outlet in the first direction; and
a locking surface provided at the upper edge, the locking surface being provided farther from the liquid outlet than the circuit board is from the liquid outlet in the first direction;
wherein the protrusion is provided farther from the liquid outlet than the circuit board is from the liquid outlet in the second direction and provided closer to the liquid outlet than the locking surface is to the liquid outlet in the second direction.

10. The liquid cartridge according to claim 9, further comprising:
- an axis in the liquid retaining chamber extending in a third direction perpendicular to the first direction and the second direction; and
- an arm rotatably supported by the axis, the arm having a first end in the liquid chamber and a second end in the internal space defined by the protrusion.

11. A liquid cartridge comprising:
- a casing having an upper edge and a bottom edge separated from the upper edge in a downward direction;
- a liquid outlet extending from the casing in a forward direction perpendicular to the downward direction;
- a circuit board provided at the upper edge;
- a light attenuator which attenuates light traveling in a right direction or a left direction which is opposite to the right direction, wherein each of the right direction and the left direction is perpendicular to the downward direction and the forward direction, wherein the light attenuator is positioned at the upper edge, wherein a distance in an upward direction, which is opposite to the downward direction, from the liquid outlet to the light attenuator is greater than a distance in the upward direction from the liquid outlet to the circuit board; and
- a locking surface provided at the upper edge, wherein a distance in the upward direction from the liquid outlet to the locking surface is greater than a distance in the upward direction from the liquid outlet to the light attenuator,
- wherein a distance in a backward direction, which is opposite to the forward direction, from the liquid outlet to the light attenuator is greater than a distance in the backward direction from the liquid outlet to the circuit board and is less than a distance in the backward direction from the liquid outlet to the locking surface.

12. The liquid cartridge according to claim 11, further comprising a light attenuating wall extending from the upper edge of the casing in the upward direction.

13. The liquid cartridge according to claim 12, wherein the distance in the backward direction from the liquid outlet to the light attenuator is greater than a distance in the backward direction from the liquid outlet to the light attenuating wall.

14. The liquid cartridge according to claim 13, wherein a distance in the upward direction from the liquid outlet to an uppermost part of the light attenuating wall is greater than the distance in the upward direction from the liquid outlet to the circuit board.

15. The liquid cartridge according to claim 14, wherein a distance in the forward direction from the light attenuator to the light attenuation wall is less than a distance in the forward direction from the light attenuator to the circuit board.

16. The liquid cartridge according to claim 11, further comprises a light access portion provided at the upper edge and defining an internal space, wherein the light attenuator is positioned in the internal space.

17. The liquid cartridge according to claim 16, wherein the light access portion is translucent, enabling light traveling in the right direction or the left direction to pass therethrough.

18. The liquid cartridge according to claim 17, further comprising a chamber configured to store liquid therein and a sensor arm provided in the chamber,
- wherein the chamber in in communication with the internal space of the light access portion, and
- wherein the light attenuator is a part of the sensor arm, and the sensor arm is configured to rotate around an axis extending in the right direction and the left direction.

19. The liquid cartridge according to claim 11, wherein the light attenuator is configured to pivot around an axis extending in the right direction and the left direction.

20. The liquid cartridge according to claim 19, further comprising a chamber configured to store liquid therein and a sensor arm provided in the chamber, wherein the light attenuator is a part of the sensor arm, and sensor arm is configured to rotate around the axis.

* * * * *

UNITED STATES PATENT AND TRADEMARK OFFICE
CERTIFICATE OF CORRECTION

PATENT NO. : 11,685,162 B2
APPLICATION NO. : 17/199588
DATED : June 27, 2023
INVENTOR(S) : Naoya Okazaki Page 1 of 1

It is certified that error appears in the above-identified patent and that said Letters Patent is hereby corrected as shown below:

In the Claims

Claim 6, Column 30, Line 33: Delete "claim 2", and insert -- claim 1 -- therefor.

Signed and Sealed this
Twenty-fourth Day of June, 2025

Coke Morgan Stewart
*Acting Director of the United States Patent and Trademark Office*